US012706723B2

(12) United States Patent
Liang et al.

(10) Patent No.: US 12,706,723 B2
(45) Date of Patent: Aug. 11, 2026

(54) RESOURCE SELECTION METHOD AND APPARATUS, AND TERMINAL

(71) Applicant: VIVO MOBILE COMMUNICATION CO., LTD., Dongguan (CN)

(72) Inventors: Jing Liang, Dongguan (CN); Qian Zheng, Dongguan (CN); Zichao Ji, Dongguan (CN); Jiamin Liu, Dongguan (CN); Jianming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 341 days.

(21) Appl. No.: 18/648,475

(22) Filed: Apr. 29, 2024

(65) Prior Publication Data

US 2024/0283617 A1 Aug. 22, 2024

Related U.S. Application Data

(63) Continuation of application No. PCT/CN2022/129473, filed on Nov. 3, 2022.

(30) Foreign Application Priority Data

Nov. 5, 2021 (CN) ........................ 202111306852.X

(51) Int. Cl.
*H04L 5/00* (2006.01)
*H04W 76/28* (2018.01)

(52) U.S. Cl.
CPC .......... *H04L 5/0078* (2013.01); *H04L 5/0053* (2013.01); *H04W 76/28* (2018.02)

(58) Field of Classification Search
CPC ..... H04L 5/0078; H04L 5/0052; H04W 76/28
See application file for complete search history.

(56) References Cited

U.S. PATENT DOCUMENTS

2021/0345249 A1* 11/2021 Xue .................. H04W 52/0232

FOREIGN PATENT DOCUMENTS

CN 112543442 A 3/2021
CN 113163358 A 7/2021
(Continued)

OTHER PUBLICATIONS

International Search Report and Written Opinion issued in corresponding International Application No. PCT/CN2022/129473, mailed Jan. 28, 2023, 8 pages.

*Primary Examiner* — Myron Wyche
(74) *Attorney, Agent, or Firm* — IPX PLLC

(57) ABSTRACT

A resource selection method is provided. The resource selection method includes sending, by a higher layer of a first terminal, first information to a physical layer of the first terminal. The first information is used for assisting the physical layer of the first terminal in selecting candidate resources for sidelink transmission. The first information includes second information related to sidelink Discontinuous Reception (DRX) of a second terminal. The second terminal is a peer terminal for the first terminal to perform sidelink transmission. The resource selection method further includes receiving, by the higher layer of the first terminal, candidate resources reported by the physical layer of the first terminal. The resource selection method also includes selecting, by the higher layer of the first terminal, a transmission resource from the candidate resources reported by the physical layer of the first terminal.

20 Claims, 6 Drawing Sheets

(56) References Cited

FOREIGN PATENT DOCUMENTS

| | | | |
|---|---|---|---|
| CN | 113225847 | A | 8/2021 |
| CN | 113453317 | A | 9/2021 |
| WO | 2020167101 | A1 | 8/2020 |
| WO | 2021218740 | A1 | 11/2021 |

* cited by examiner

600

Resource selection apparatus

First sending module 601

First receiving module 602

First selection module 603

RESOURCE SELECTION METHOD AND APPARATUS, AND TERMINAL

CROSS-REFERENCE TO RELATED APPLICATIONS

This application is a continuation of International Application No. PCT/CN2022/129473, filed on Nov. 3, 2022, which claims the priority of Chinese Patent Application No. 202111306852.X filed on Nov. 5, 2021. The entire contents of each of the above-referenced applications are expressly incorporated herein by reference.

TECHNICAL FIELD

This application relates to the field of communication technologies, and in particular, to a resource selection method and apparatus, and a terminal.

BACKGROUND

With continuous development of mobile communication technologies, some mobile communication systems support a Sidelink (SL), and data may be directly transmitted between User Equipments (UEs) (which may also be referred to as terminals or terminal devices) based on the sidelink. Currently, sidelink transmission is mainly divided into several transmission manners, namely, broadcast, groupcast, and unicast. The sidelink supports a Discontinuous Reception (DRX) configuration for unicast, groupcast, and broadcast. In this way, when a Transmitting-side UE (that is, a TX UE) on the sidelink transmits data to a Receiving-side UE (that is, an RX UE), failure of data transmission is prone to occur because the RX UE is not always in a receiving state.

SUMMARY

Embodiments of this application provide a resource selection method and apparatus, and a terminal, so that a transmitting-side terminal on a sidelink can more properly select a resource for sidelink transmission, to improve stability of data transmission.

According to a first aspect, a resource selection method is provided, including:

- sending, by a higher layer of a first terminal, first information to a physical layer of the first terminal, where the first information is used for assisting the physical layer in selecting candidate resources for sidelink transmission, the first information includes second information related to sidelink discontinuous reception DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time;
- receiving, by the higher layer, candidate resources reported by the physical layer; and
- selecting, by the higher layer, a transmission resource from the candidate resources reported by the physical layer.

According to a second aspect, a resource selection apparatus is provided, including:

- a first sending module, configured to send first information to a physical layer of a first terminal, where the first information is used for assisting the physical layer in selecting candidate resources for sidelink transmission, the first information includes second information related to sidelink discontinuous reception DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time;
- a first receiving module, configured to receive candidate resources reported by the physical layer; and
- a first selection module, configured to select a transmission resource from the candidate resources reported by the physical layer.

According to a third aspect, a resource selection method is provided, including:

- receiving, by a physical layer of a first terminal, first information from a higher layer of the first terminal, where the first information is used for assisting the physical layer in selecting candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time;
- selecting, by the physical layer, candidate resources according to the first information; and
- reporting, by the physical layer, the candidate resources to the higher layer.

According to a fourth aspect, a resource selection apparatus is provided, including:

- a second receiving module, configured to receive first information from a higher layer of a first terminal, where the first information is used for a physical layer of the first terminal to select candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time;
- a second selection module, configured to select candidate resources according to the first information; and
- a reporting module, configured to report the candidate resources to the higher layer.

According to a fifth aspect, a first terminal is provided, including a processor, a memory, and a program or instructions stored in the memory and executable on the processor, the program or instructions, when executed by the processor, implementing the steps of the method according to the first aspect.

According to a sixth aspect, a first terminal is provided, including a processor and a communication interface, where the processor is configured to send, by a higher layer of the first terminal, first information to a physical layer of the first terminal, where the first information is used for assisting the physical layer in selecting candidate resources for sidelink transmission, the first information includes second information related to sidelink discontinuous reception DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time; the processor is further configured to receive, by the higher layer, candidate resources reported by the physical layer; and the processor is further configured to select, by the higher layer, a transmission resource from the candidate resources reported by the physical layer.

According to a seventh aspect, a first terminal is provided, including a processor, a memory, and a program or instructions stored in the memory and executable on the processor, the program or instructions, when executed by the processor, implementing the steps of the method according to the third aspect.

According to an eighth aspect, a first terminal is provided, including a processor and a communication interface, where the processor is configured to receive, by a physical layer of the first terminal, first information from a higher layer of the first terminal, where the first information is used for assisting the physical layer in selecting candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time; the processor is further configured to select, by the physical layer, candidate resources according to the first information; and the processor is further configured to report, by the physical layer, the candidate resources to the higher layer.

According to a ninth aspect, a readable storage medium is provided, the readable storage medium storing a program or instructions, the program or instructions, when executed by a processor, implementing the steps of the method according to the first aspect or the steps of the method according to the third aspect.

According to a tenth aspect, a chip is provided, including a processor and a communication interface, the communication interface being coupled to the processor, and the processor being configured to run a program or instructions to implement the steps of the method according to the first aspect or the steps of the method according to the third aspect.

According to an eleventh aspect, a computer program product is provided, the computer program product being stored in a non-transient storage medium, and the computer program product being executed by at least one processor to implement the steps of the method according to the first aspect or the steps of the method according to the third aspect.

According to a twelfth aspect, a communication device is provided, configured to implement the steps of the resource selection method according to the first aspect or the steps of the resource selection method according to the third aspect.

In the embodiments of this application, the higher layer of the first terminal sends, to physical layer of the first terminal, the second information related to sidelink DRX of the second terminal, so that the physical layer of the first terminal may select candidate resources more properly based on the active time indicated by the received second information and report the candidate resources to the higher layer of the first terminal. In this way, when the higher layer of the first terminal selects the transmission resource from the candidate resources reported by the physical layer to transmit data to the second terminal, data transmission failure may be reduced, thereby improving stability of data transmission.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

In the specification and the claims of this application, the terms "first," "second," and so on are intended to distinguish similar objects but do not necessarily indicate a specific order or sequence. It is to be understood that the term used in such a way is interchangeable in proper circumstances, so that the embodiments of this application can be implemented in other sequences than the sequence illustrated or described herein. In addition, the objects distinguished by "first," "second," and the like are usually of one type, and a quantity of objects is not limited, for example, there may be one or more first objects. In addition, "and/or" used in the specification and the claims represents at least one of the connected objects, and a character "/" in this specification generally indicates an "or" relationship between the associated objects.

It is to be noted that, the technologies described in the embodiments of this application are not limited to a Long Term Evolution (LTE)/LTE-Advanced (LTE-A) system, or may be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. In the embodiments of this application, the terms "system" and "network" are usually interchangeably used, and the technology described herein can be applied to the systems and radio technologies mentioned above, and can also be applied to other systems and radio technologies. However, although the technologies are also applicable to applications other than NR system applications, for example, a 6th Generation (6G) communication system, a New Radio (NR) system is exemplarily described in the following descriptions, and the term "NR" is used in most of the following descriptions.

Figure 1:
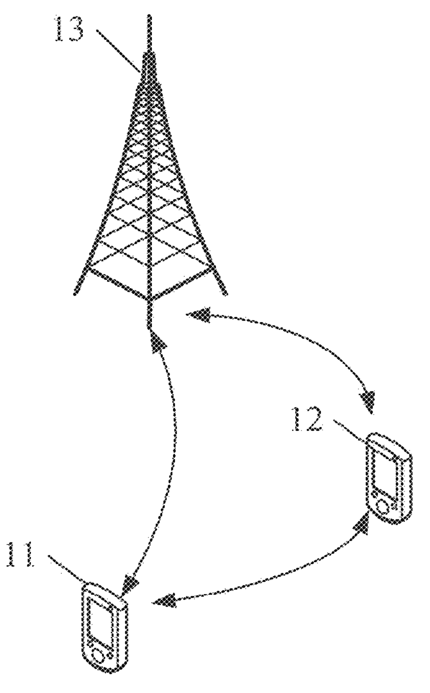
FIG. 1 is a block diagram of a wireless communication system according to an embodiment of this application.

FIG. 1 shows a block diagram of a wireless communication system to which an embodiment of this application is applicable. The communication system includes a terminal 11 and a network side device 12. However, the terminal 11 may also be referred to as a terminal device or a UE. The terminal 11 may be a terminal side device such as a mobile phone, a tablet personal computer, a laptop computer or notebook computer, a Personal Digital Assistant (PDA), a palmtop computer, a notebook, an Ultra-Mobile Personal Computer (UMPC), a Mobile Internet Device (MID), a wearable device, a Vehicle User Equipment (VUE), a Pedestrian User Equipment (PUE), or the like. The wearable device includes a smart watch, a bracelet, a headset, glasses, and the like. It is to be noted that, a specific type of the terminal 11 is not limited in the embodiments of this application. The network side device 12 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a Wireless Local Area Network (WLAN) access point, a Wireless Fidelity (Wi-Fi) node, a Transmission and Reception Point (TRP), or another suitable term in the field. The base station is not limited to a specific technical term as long as the same technical effect is achieved. It is to be noted that, in the embodiments of this application, the base station in the NR system is only used as an example for description, but a specific type of the base station is not limited.

For ease of understanding, related content in the embodiments of this application is described below.

An SL is described below.

An LTE system supports sidelink transmission from the $12^{th}$ release, which is used for direct data transmission between UEs (also referred to as terminals) without using a network device.

The UE sends Sidelink Control Information (SCI) through a Physical Sidelink Control Channel (PSCCH), and schedules transmission on a Physical Sidelink Shared Channel (PSSCH) to send data. Transmission is performed in a broadcast form, and a receive end does not feed back, to a transmit end, whether reception is successful.

A design of an LTE sidelink supports two resource allocation modes, namely, a scheduled resource allocation mode and an autonomous resource selection mode. The former is controlled by the network side device and allocates a resource to each UE, and the latter allows the UE to autonomously select resources.

Starting from the $15^{th}$ release, the LTE supports sidelink Carrier Aggregation (CA). The CA and Uu interfaces (that is, a downlink and an uplink) of the LTE Sidelink are different, and there is no distinction between a Primary Component Carrier (PCC) and a Secondary Component Carrier (SCC). In the autonomous resource selection mode, the UE independently performs resource sensing and resource reservation on each Component Carrier (CC).

The design of the LTE sidelink is applicable to specific public safety matters (for example, emergency communication in disaster sites such as fires or earthquakes), Vehicle to everything (V2X) communication, or the like. Vehicle to everything communication can include various services, for example, basic safety communication, autonomous driving, vehicle platoon, sensor expansion, and the like. Since the LTE sidelink only supports broadcast communication, which is mainly used for basic security communication. Other advanced V2X services that have strict Quality of Service (QoS) requirements in terms of a delay, reliability, and the like may be supported through an NR sidelink.

The 5th-Generation mobile communication (5G) NR system may be used in operating frequency bands above 6 GHz that are not supported by the LTE, which supports larger operating bandwidth. However, the NR system of a current version only supports an interface between the base station, but the terminal and does not support a sidelink interface for direct communication between terminals.

In some embodiments, in a Proximity Services (ProSe) network architecture, a communication interface between terminals is referred to as a PC5 interface, and an interface connected between a terminal and an access network device such as Evolved Universal Terrestrial Radio Access (E-UTRAN) is referred to as a Uu interface.

Transmission forms of the sidelink are described below.

Current sidelink transmission mainly includes the following transmission forms: broadcast, groupcast, and unicast. Unicast is one-to-one transmission. Groupcast is one-to-many transmission. Broadcast is one-to-many transmission, but broadcast does not have a concept that UEs belong to a same group. Currently, sidelink unicast and groupcast communication supports a physical layer Hybrid Automatic Repeat reQuest (HARQ) feedback mechanism.

In addition, the NR sidelink defines two modes. One is Mode1 in which the base station schedules resources, and the other is Mode2 in which the UE decides what resources to use for transmission. In this case, resource information may be from a broadcast message of the base station or may be pre-configured. If the UE works within a range of the base station and has a Radio Resource Control (RRC) connection with the base station, the UE may work in the mode1 and/or the mode2. If the UE works within the range of the base station but has no RRC connection with the base station, the UE may only work in the mode2. If the UE is outside the range of the base station, the UE may only work in the mode2 and perform V2X transmission based on the pre-configured information. It is to be noted that, the mode2 may be further divided into modes 2a, 2b, 2c, and 2d.

A resource pool is described below.

Currently, there is a concept of the resource pool during V2X transmission. The resource pool may be sent or pre-configured by the network side device. The resource pool may include resources used for transmission and transmission-related parameters. For example, in the LTE, the resource pool may include an offset value of a first subframe of the resource pool, a bitmap corresponding to the resource pool, and whether a PSCCH and a PSSCH may be transmitted on adjacent Resource Blocks (RBs), a number of sub-channels and a size of each sub-channel, a minimum RB index value corresponding to a PSCCH pool (that is, a pool), a minimum Sidelink Received Signal Strength Indicator (S-RSSI) threshold for Channel Busy Rate (CBR) measurement, an area identity, and the like.

Currently, in addition to configuring an ordinary transmission resource pool for the UE, the network side device may also configure an exceptional pool. The exceptional pool is used in some special situations, for example, in a handover process, or when Radio Link Failure (RLF) occurs, or in a process of handing over from an idle state to a connected state.

For UEs within different network coverage ranges, a resource pool and corresponding resources may be selected based on network side device scheduling, or a resource pool may be autonomously selected based on preconfiguration. During selection of the resource pool, an area where the UE is located may need to be considered, to select a resource pool related to the area where the UE is located. Autonomous selection on resources in the resource pool is performed mainly based on a sensing mechanism or may be randomly performed (for example, resource selection the exceptional pool).

DRX in an RRC connected state on the Uu interface is described below.

An objective of DRX is to save power. The terminal in a DRX state does not need connect and monitor a control channel. However, if the terminal does not monitor the control channel for a long time, once data arrives, data transmission delay may be increased. To consider both power saving and a transmission delay, based on duration for the terminal to monitor the channel, 5G Media Access Control (MAC) supports two DRX cycles, namely, a drx-LongCycle and a drx-ShortCycle. If a terminal data volume is predicted to be frequent or the service is sensitive to delay, the network side device may configure the terminal to use the drx-ShortCycle. If the terminal data volume is predicted to be sparse and delay-insensitive, the network side device may configure the terminal to only use the drx-LongCycle. To facilitate the terminal to hand over between the drx-LongCycle/drx-ShortCycle, the drx-LongCycle is required to be an integer multiple of the drx-ShortCycle, to ensure that onDurations of the two are aligned.

To support a DRX mechanism, the base station may configure DRX-related timers and parameters for the terminal, which may include:

A drx-LongCycleStartOffset is used for configuring a cycle and an offset of the drx-LongCycle, where a unit of the cycle and the offset is milliseconds.

The drx-ShortCycle is used for configuring a cycle and an offset of the drx-ShortCycle, where a unit of the cycle and the offset is milliseconds.

A drx-ShortCycleTimer is configured to control duration for the terminal to use the drx-ShortCycle. A unit is an integer, which means that once the terminal enters the drx-ShortCycle, integer multiples of short cycle need to be maintained.

For a drx-onDurationTimer, during running of the timer, the terminal needs to continuously monitor a Physical Downlink Control Channel (PDCCH) of a network, where a unit of the timer is milliseconds.

A drx-SlotOffset is a delay for the terminal to start or restart the drx-onDurationTimer, and the parameter is used to set an offset of a starting moment of the DRX onDuration relative to a starting point of the subframe, where the offset is an integer multiple of 1/32 milliseconds.

A drx-InactivityTimer is started or restarted on the first symbol after the terminal receives PDCCH signaling for uplink/downlink new data scheduling, and during running of the timer, the terminal needs to continuously monitor the control channel, where a unit of the timer is milliseconds.

A drx-HARQ-RTT-TimerDL is also referred to as a drx-DL-HARQ-RTT-Timer, and is maintained based on each downlink process, where a unit of the timer is a minimum time interval from a HARQ feedback moment and to reception of HARQ retransmission for the process. Only when data corresponding to the downlink process is not successfully decoded, the terminal starts the timer on the first symbol after the HARQ NACK feedback of the process. If the terminal currently only runs the drx-HARQ-RTT-TimerDL and/or the drx-HARQ-RTT-TimerUL, the terminal does not need to monitor the PDCCH control channel, where a unit of the timer is a symbol.

A drx-HARQ-RTT-TimerUL is also referred to as a UL-HARQ-RTT-Timer, and is maintained based on each uplink process, where a unit of the timer is a minimum time interval from a PUSCH transmission moment and to reception of HARQ retransmission for the process. After uplink PUSCH transmission, the terminal starts or restarts the UL-HARQ-RTT-Timer for the uplink process. If the PUSCH transmission uses Physical Uplink Sharing Channel (PUSCH) repetition, the UL-HARQ-RTT-Timer is started or restarted after the first PUSCH repetition, to ensure that the base station can terminate PUSCH repeated transmission in time after parsing the PUSCH in advance, where a unit of the timer is a symbol.

A drx-RetransmissionTimerDL is started or restarted on a next symbol after the drx-HARQ-RTT-TimerDL times out. During running of the timer, the terminal monitors the control channel of the network, and the timer is stopped if downlink scheduling information or a downlink configured grant for the process is received, where a unit of the timer is a slot.

A drx-RetransmissionTimerUL is started or restarted on a next symbol after the drx-HARQ-RTT-TimerUL times out. During running of the timer, the terminal monitors the control channel of the network, and the timer is stopped if uplink scheduling information or an uplink configured grant for the process is received, where a unit of the timer is a slot.

Figure 2:
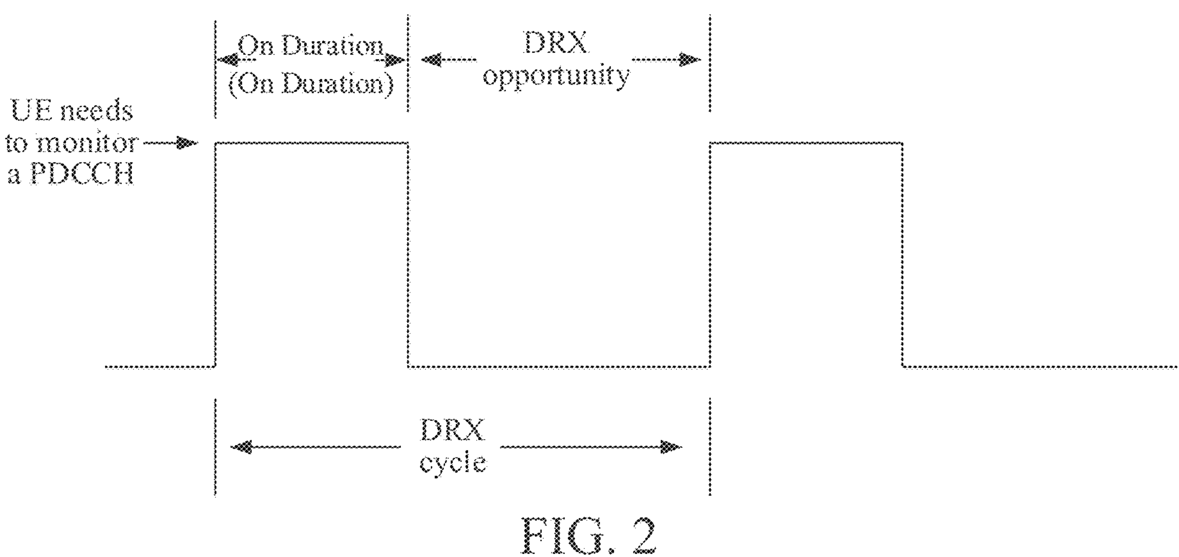
FIG. 2 is a schematic diagram of a DRX cycle according to an embodiment of this application.
Figure 3:
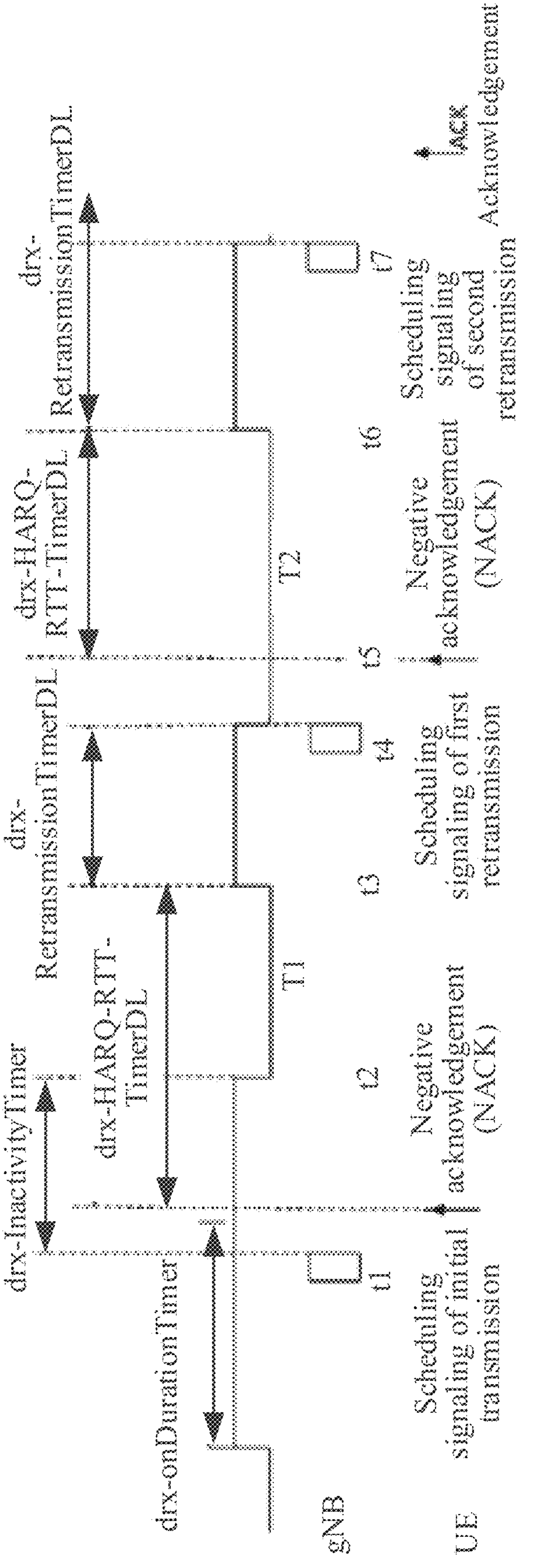
FIG. 3 is a schematic diagram of DRX transmission according to an embodiment of this application.

Existing basic DRX mechanisms and related parameters are described above. All the parameters form a set of DRX configuration, and the UE performs corresponding discontinuous reception according to this configuration. As shown in FIG. 2, time is divided into consecutive DRX cycles in time domain. FIG. 3 is a schematic diagram of DRX transmission. In FIG. 3, t1 represents a scheduling signaling moment of initial transmission, t2 represents a moment at which a drx-InactivityTimer times out, t3 represents a moment at which a drx-HARQ-RTT-TimerDL times out, t4 represents a scheduling signaling time of first retransmission, t5 represents a moment at which NACK is received and the drx-HARQ-RTT-TimerDL is started, t6 represents a moment at which the drx-HARQ-RTT-TimerDL times out, and t7 represents a scheduling signaling moment of second retransmission. T1 and T2 represent a moment when the UE is actually off for DRX, that is, there is no moment at which a timer that may trigger the UE to enter the active state is running.

Sidelink DRX is described below.

Currently, sidelink supports DRX configuration for unicast, groupcast, and broadcast. For the on-duration timer, three cast types are all supported currently. For the Inactivity timer, unicast and groupcast are supported, and broadcast is not supported temporarily.

In addition, different from the Uu interface, because both a transmit end and a receive end on the sidelink are UEs, a behavior of an RX UE and a behavior of a TX UE may need to be defined. For the RX UE, a moment at which the Inactivity timer is started or restarted is on a next slot or symbol after a moment at which first SCI and second SCI are received.

Sidelink resource selection is described below.

DRX is introduced into the sidelink, and the RX UE is not always in a receiving state. Therefore, before the TX UE transmits data, it is necessary to consider an active time of the RX UE and select resources within the corresponding active time for transmission, so that transmission and reception may be normally performed.

With reference to the accompanying drawings, a resource selection method provided in the embodiments of this application is described in detail below by using some embodiments and application scenarios thereof.

Figure 4:
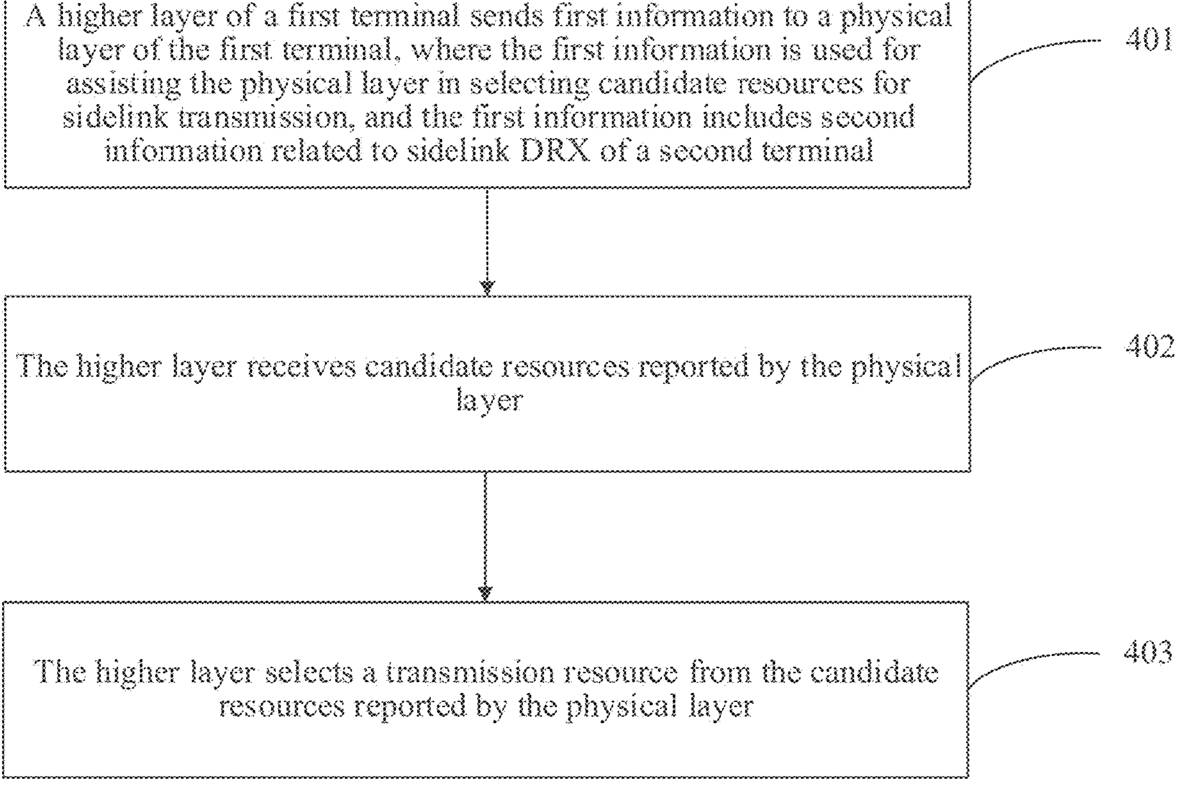
FIG. 4 is a flowchart of a resource selection method according to an embodiment of this application.

Refer to FIG. 4. FIG. 4 is a flowchart of a resource selection method according to an embodiment of this application. The method may be performed by a higher layer of a terminal. As shown in FIG. 4, the method includes the following steps.

Step 401: A higher layer of a first terminal sends first information to a physical layer of the first terminal, where the first information is used for assisting the physical layer in selecting candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time.

In this embodiment, the higher layer of the first terminal may be relative to the physical layer of the first terminal. For example, the higher layer of the first terminal may include a MAC layer, a Radio Link Control (RLC) layer or a Radio Resource Control (RRC) layer, and the like.

The second terminal is the peer terminal for the first terminal to perform sidelink transmission. For example, the first terminal is the TX UE on the sidelink, and the second terminal is the RX UE on the sidelink. There may be one or more second terminals, that is, the first information may include second information of one or more second terminals.

The DRX configuration information may include but is not limited to at least one of an sl-drx-StartOffset, an sl-drx-Cycle, an sl-drx-onDurationTimer, an sl-drx-SlotOffset, an sl-DRXInactivityTimer, an sl-drx-RetransmissionTimer, and the like.

The at least part of the DRX configuration information may include all configuration information of the DRX configuration information that is for sidelink transmission by the second terminal and that is received by the first terminal. For example, the higher layer of the first terminal may directly transmit, to the physical layer of the first terminal, the DRX configuration information that is for sidelink transmission by the second terminal and that is received by the network side device or the second terminal. In some alternative embodiments, the at least part of the DRX configuration information may only include configuration information that is in the DRX configuration information and that is related to the active time. For example, the at least part of the DRX configuration information may only include configuration information that is in the DRX configuration information and that is related to at least one of the active time corresponding to the drx-onDurationTimer, the active time corresponding to the drx-InactivityTimer, and the active time corresponding to the drx-RetransmissionTimer.

The drx-onDurationTimer for sidelink transmission may also be referred to as the sl-drx-onDurationTimer. The drx-InactivityTimer for sidelink transmission may also be referred to as the sl-DRXInactivityTimer. The drx-RetransmissionTimer for sidelink transmission may also be referred to as the sl-drx-RetransmissionTimer.

The active time corresponding to the drx-InactivityTimer may include an active time determined based on a real-time update result. For example, the active time corresponding to the drx-InactivityTimer may include an active time corresponding to the sl-DRXInactivityTimer of SCI scheduling that actually occurs. The active time corresponding to the drx-InactivityTimer may also include an active time determined based on a prediction result. For example, the active time corresponding to the drx-InactivityTimer may include an active time corresponding to the sl-DRXInactivityTimer of SCI scheduling that is predicted to occur.

The active time corresponding to the drx-RetransmissionTimer may include an active time determined based on a real-time update result. For example, the active time corresponding to the drx-RetransmissionTimer may include an active time corresponding to the sl-drx-RetransmissionTimer of retransmission that actually occurs. The active time corresponding to the drx-RetransmissionTimer may include an active time determined based on a prediction result. For example, the active time corresponding to the drx-RetransmissionTimer may include an active time corresponding to the sl-drx-RetransmissionTimer of retransmission that is predicted to occur.

For the number of cycles of the active time, in a cyclic service, resource selection may be performed in consideration of the number of cycles of the active time.

In this embodiment, the higher layer provides the first information to the physical layer, so that the physical layer may select candidate resources based on the first information. For example, the physical layer may select candidate resources based on the active time indicated by the second information in the first information, so that the selected candidate resources are at least partially within the active time indicated by the second information.

Step 402: The higher layer receives candidate resources reported by the physical layer.

In this embodiment, the physical layer may report one or more sets of candidate resources. For example, the physical layer may report two sets of candidate resources. One set of candidate resources is used for selecting an initial transmission resource, and the other set of candidate resources is used for selecting a retransmission resource.

Step 403: The higher layer selects a transmission resource from the candidate resources reported by the physical layer.

For example, the higher layer may select the initial transmission resource only from the candidate resources reported by the physical layer, or the higher layer may select the retransmission resource only from the candidate resources reported by the physical layer, or the higher layer may select the initial transmission resource and the retransmission resource from the candidate resources reported by the physical layer.

It is to be noted that, the higher layer may select some resources from the candidate resources reported by the physical layer, or select all resources from the candidate resources reported by the physical layer. In other words, all the candidate resources reported by the physical layer may be used by the higher layer for transmission.

In the resource selection method provided in the embodiments of this application, the higher layer of the first terminal sends, to physical layer of the first terminal, the second information related to sidelink DRX of the second terminal, so that the physical layer of the first terminal may select candidate resources more properly based on the active time indicated by the received second information and report the candidate resources to the higher layer of the first terminal. In this way, when the higher layer of the first terminal selects the transmission resource from the candidate resources reported by the physical layer to transmit data to the second terminal, data transmission failure may be reduced, thereby improving stability of data transmission.

In some embodiments, the second information includes the at least part of the DRX configuration information; and the sending, by a higher layer of a first terminal, first information to a physical layer of the first terminal includes:

sending, by the higher layer, the first information to the physical layer in a case that a first condition is met, where the first condition includes at least one of the following:

the DRX configuration information changes; and the first terminal triggers resource selection, the first terminal triggers resource reselection, or the first terminal triggers any one of resource selection and resource reselection.

In an embodiment, the higher layer may send the first information to the physical layer in a case that the DRX configuration information changes. For example, the higher layer may send the first information to the physical layer when the DRX configuration information changes, or the higher layer may send the first information to the physical layer within a first preset time period after the DRX configuration information changes, where the first preset time period may be pre-agreed, configured by the network side device, or the like.

In another implementation, the higher layer may send the first information to the physical layer in a case that the first terminal triggers resource selection, the first terminal triggers resource reselection, or the first terminal triggers any one of resource selection and resource reselection. For example, the higher layer may send the first information to the physical layer only when the first terminal triggers resource selection; or the higher layer may send the first information to the physical layer only when the first terminal triggers resource reselection; or the higher layer may send the first information to the physical layer when the first terminal triggers any one of resource selection and resource reselection.

In another implementation, the higher layer may send the first information to the physical layer in a case that the DRX configuration information changes, and the first terminal triggers resource selection or the first terminal triggers resource reselection or the first terminal triggers any one of resource selection and resource reselection.

In some embodiments, the second information includes the active time corresponding to the drx-onDurationTimer; and the sending, by a higher layer of a first terminal, first information to a physical layer of the first terminal includes:

sending, by the higher layer, the first information to the physical layer in a case that a second condition is met, where the second condition includes at least one of the following:

the DRX configuration information changes;

the first terminal triggers resource selection, the first terminal triggers resource reselection, or the first terminal triggers any one of resource selection and resource reselection;

a current service is a broadcast service, a current service is a groupcast service, a current service is a unicast service, or a current service is any one of at least two services of a broadcast service, a groupcast service, and a unicast service;

a condition for triggering resource selection is met, a condition for triggering resource reselection is met, or any one of a condition for triggering resource selection and a condition for triggering resource reselection is met;

after the higher layer previously sends the first information to the physical layer, the physical layer has not fed back the candidate resources or the physical layer has fed back the candidate resources;

a priority of the current service is higher than a priority of a service when the higher layer previously sends the first information to the physical layer; and a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection.

In an implementation, the higher layer may send the first information to the physical layer in a case that the DRX configuration information changes. For example, the higher layer may send the first information to the physical layer when the DRX configuration information changes.

In another implementation, the higher layer may send the first information to the physical layer in a case that the first terminal triggers resource selection, the first terminal triggers resource reselection, or the first terminal triggers any one of resource selection and resource reselection. For example, the higher layer may send the first information to the physical layer only when the first terminal triggers resource selection; or the higher layer may send the first information to the physical layer only when the first terminal triggers resource reselection; or the higher layer may send the first information to the physical layer when the first terminal triggers any one of resource selection and resource reselection.

In another implementation, the higher layer may send the first information to the physical layer in a case that a current service is a broadcast service, a current service is a groupcast service, a current service is a unicast service, or a current service is any one of at least two services of a broadcast service, a groupcast service, and a unicast service. For example, the higher layer may send the first information to the physical layer only when the current service is the broadcast service; or the higher layer may send the first information to the physical layer only when the current service is the groupcast service; or the higher layer may send the first information to the physical layer only when the current service is the unicast service; or the higher layer may send the first information to the physical layer when the current service is any one of the broadcast service and the groupcast service; or the higher layer may send the first information to the physical layer when the current service is any one of the unicast service and the groupcast service; or the higher layer may send the first information to the physical layer when the current service is any one of the broadcast service and the unicast service; or the higher layer may send the first information to the physical layer when the current service is any one of the broadcast service, the groupcast service, and the unicast service.

In another implementation, the higher layer may send the first information to the physical layer in a case that a condition for triggering resource selection is met, a condition for triggering resource reselection is met, or any one of a condition for triggering resource selection and a condition for triggering resource reselection is met. For example, the higher layer may send the first information to the physical layer only when the condition for triggering resource selection is met; or the higher layer may send the first information to the physical layer only when the condition for triggering resource reselection is met; or the higher layer may send the first information to the physical layer when any one of the condition for triggering resource selection and the condition for triggering resource reselection is met.

That the condition for triggering resource selection or the condition for triggering resource reselection is met may include but is not limited to the following: there is a data packet on a logical channel, pre-emption occurs, re-evaluation occurs, and the like.

In another implementation, after the higher layer previously sends the first information to the physical layer, the higher layer sends the first information to the physical layer in a case that the physical layer has not fed back the candidate resources or the physical layer has fed back the candidate resources. For example, after the higher layer previously sends the first information to the physical layer, the higher layer sends the first information to the physical layer when the physical layer has not fed back the candidate resources; or after the higher layer previously sends the first information to the physical layer, the higher layer sends the first information to the physical layer when the physical layer has fed back the candidate resources.

In another implementation, the higher layer may send the first information to the physical layer when a priority of the current service is higher than a priority of a service when the higher layer previously sends the first information to the physical layer.

In another implementation, the higher layer may send the first information to the physical layer in a case that a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection. For example, the higher layer sends the first information to the physical layer only when the currently selected resource pool is configured as full sensing; or the higher layer sends the first information to the physical layer only when the currently selected resource pool is configured as partial sensing; or the higher layer sends the first information to the physical layer only when the currently selected resource pool is configured as random selection; or the higher layer sends the first information to the physical layer only when the currently selected resource pool is configured as any one of full sensing and partial sensing; or the higher layer sends the first information to the physical layer when the currently selected resource pool is configured as any one of full sensing and random selection; or the higher layer sends the first information to the physical layer when the currently selected resource pool is configured as any one of partial sensing and random selection; or the higher layer sends the first information to the physical layer when the currently selected resource pool is configured as any one of full sensing, partial sensing, and random selection.

The partial sensing may include periodic partial sensing, contiguous partial sensing, and the like.

It is to be noted that, the conditions in the implementations may be randomly combined, and the higher layer may send the first information to the physical layer only when all conditions in the combination are met. For example, the higher layer may send the first information to the physical layer only when the first terminal triggers resource selection and the current service is the unicast service. This is not listed in this embodiment of this application one by one.

In addition, it is to be noted that, that the first information is sent to the physical layer when the second condition is met may be to send the first information to the physical layer immediately when the second condition is met, or may be to send the first information to the physical layer in a period of time after the second condition is met. This is not limited in this embodiment.

In some embodiments, the second information includes the active time corresponding to the drx-InactivityTimer; and the sending, by a higher layer of a first terminal, first information to a physical layer of the first terminal includes:

sending, by the higher layer, the first information to the physical layer in a case that a third condition is met, where the third condition includes at least one of the following:

the DRX configuration information changes;

the first terminal triggers resource selection, the first terminal triggers resource reselection, or the first terminal triggers any one of resource selection and resource reselection;

the first terminal performs SCI scheduling for N1 times, N1 being a positive integer;

the first terminal starts an inactivity timer of the first terminal;

a current service includes at least one of a groupcast service and a unicast service;

a condition for triggering resource selection is met, a condition for triggering resource reselection is met, or any one of a condition for triggering resource selection and a condition for triggering resource reselection is met;

after the higher layer previously sends the first information to the physical layer, the physical layer has not fed back the candidate resources or the physical layer has fed back the candidate resources;

a priority of the current service is higher than a priority of a service when the higher layer previously sends the first information to the physical layer; and a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection.

In this embodiment, a value of N1 may be configured by the network side device, or may be determined by the first terminal, or may be indicated by the second terminal, or may be predefined in a protocol, or the like. For example, the network side device or the first terminal or the second terminal may determine the value of N1 based on QoS of the service. The SCI may include at least one of first stage SCI, second stage SCI, and the like.

The inactivity timer of the first terminal may be an inactive timer that is of the first terminal and that serves as a transmitting-side UE, and is configured to determine a discontinuous reception state of the second terminal when the first terminal sends data to the second terminal.

It is to be noted that, for some content of this embodiment, refer to the relevant description of the embodiment in which the second information includes the active time corresponding to the drx-onDurationTimer. To avoid repetition, details are not described herein again.

In some embodiments, the second information includes the active time corresponding to the drx-InactivityTimer; and the sending, by a higher layer of a first terminal, first information to a physical layer of the first terminal includes:

sending, by the higher layer, the first information to the physical layer at a first moment, where the first moment includes at least one of the following:

a moment of N2 time units before the first terminal predicts to perform SCI scheduling, N2 being a positive integer;

a moment of N3 time units after the first terminal actually performs SCI scheduling, N3 being a positive integer; and a moment of N4 time units before the first terminal starts an inactivity timer of the first terminal, N4 being a positive integer.

In this embodiment, a value of at least one of N2, N3, and N4 may be configured by the network side device, or may be determined by the first terminal, or may be indicated by the second terminal, or may be predefined in a protocol, or the like. For example, the network side device or the first terminal or the second terminal may determine the value of at least one of N2, N3, and N4 based on the QoS of the service. The time unit may include but is not limited to a slot, a symbol, a symbol group, a slot group, or the like.

The higher layer sends the first information to the physical layer at the moment of N2 time units before the first terminal predicts to perform SCI scheduling. For example, for the cyclic service, the first terminal may predict a moment at which SCI scheduling occurs, so that the higher layer may send the first information to the physical layer at the moment of N2 time units before the moment predicted by the first terminal at which SCI scheduling occurs.

In some embodiments, the active time corresponding to the drx-InactivityTimer includes at least one of the following:

in a case that SCI scheduling does not occur, an active time corresponding to the drx-InactivityTimer related to SCI scheduling that is predicted to occur for N5 times, N5 being a positive integer;

in a case that SCI scheduling occurs, an active time corresponding to the drx-InactivityTimer related to current SCI scheduling;

in a case that SCI scheduling occurs, an active time corresponding to the drx-InactivityTimer related to current SCI scheduling and an active time corresponding to the drx-InactivityTimer related to N6 times of SCI scheduling after the current SCI scheduling, N6 being a positive integer; and in a case that a current service is a cyclic service, at least one of an active time corresponding to a drx-InactivityTimer of a current cycle and an active time corresponding to a drx-InactivityTimer of N7 cycles after the current cycle, N7 being a positive integer.

In this embodiment, a value of at least one of N5, N6, and N7 may be configured by the network side device, or may be determined by the first terminal, or may be indicated by the second terminal, or may be predefined in a protocol, or the like. For example, the network side device or the first terminal or the second terminal may determine a value of at least one of N5 and N6 based on a cycle of a current service, and the network side device or the first terminal or the second terminal may determine a value of N7 based on the QoS of the service.

The active time corresponding to the drx-InactivityTimer related to SCI scheduling predicted to occur for N5 times may include an active time corresponding to the drx-InactivityTimer related to each of N5 times of SCI scheduling.

The active time corresponding to the drx-InactivityTimer related to N6 times of SCI scheduling after the current SCI scheduling may include an active time corresponding to the drx-InactivityTimer related to each of N6 times of SCI scheduling.

In some embodiments, the second information includes the active time corresponding to the drx-Retransmission-Timer; and the sending, by a higher layer of a first terminal, first information to a physical layer of the first terminal includes:

sending, by the higher layer, the first information to the physical layer in a case that a fourth condition is met, where the fourth condition includes at least one of the following:

the DRX configuration information changes;

the first terminal triggers resource selection, the first terminal triggers resource reselection, or the first terminal triggers any one of resource selection and resource reselection;

the first terminal receives Negative Acknowledgement (NACK) information of the second terminal for N8 times, N8 being a positive integer;

the first terminal starts a retransmission timer of the first terminal;

a current service is a groupcast service, a current service is a unicast service, or a current service is any one of a groupcast service and a unicast service;

a condition for triggering resource selection is met, a condition for triggering resource reselection is met, or any one of a condition for triggering resource selection and a condition for triggering resource reselection is met;

after the higher layer previously sends the first information to the physical layer, the physical layer has not fed back the candidate resources or the physical layer has fed back the candidate resources;

a priority of the current service is higher than a priority of a service when the higher layer previously sends the first information to the physical layer; and a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection;

a Physical Sidelink Feedback Channel (PSFCH) is configured for a currently selected resource pool, or a PSFCH is not configured for a currently selected resource pool; and a HARQ attribute of a current logical channel is enabled, or a HARQ attribute of a current logical channel is disabled.

In this embodiment, a value of N8 may be configured by the network side device, or may be determined by the first terminal, or may be indicated by the second terminal, or may be predefined in a protocol, or the like. For example, the network side device or the first terminal or the second terminal may determine a value of N8 based on the QoS of the service.

The current logical channel may be a logical channel that currently triggers resource selection or resource reselection, or a logical channel with a highest priority in all logical channels that currently have data, or the like.

It is to be noted that, for some content of this embodiment, refer to the relevant description of the embodiment in which the second information includes the active time corresponding to the drx-onDurationTimer. To avoid repetition, details are not described herein again.

In some embodiments, the second information includes the active time corresponding to the drx-RetransmissionTimer; and the sending, by a higher layer of a first terminal, first information to a physical layer of the first terminal includes:

sending, by the higher layer, the first information to the physical layer at a second moment, where the second moment includes at least one of the following:

a moment of N9 time units before the first terminal predicts previous transmission failure, N9 being a positive integer;

a moment of N10 time units after the first terminal previously fails in transmission, N10 being a positive integer; and a moment of N11 time units before the first terminal starts a retransmission timer of the first terminal, N11 being a positive integer.

In this embodiment, a value of at least one of N9, N10, and N11 may be configured by the network side device, or may be determined by the first terminal, or may be indicated by the second terminal, or may be predefined in a protocol, or the like. For example, the network side device or the first terminal or the second terminal may determine the value of at least one of N9, N10, and N11 based on the QoS of the service. The time unit may include but is not limited to a slot, a symbol, a symbol group, a slot group, or the like.

That the first terminal predicts previous transmission failure may mean, for example, that the first terminal may predict previous transmission failure based on a comparison result between a measured CBR and a preset threshold. For example, the first terminal predicts that the previous transmission fails in a case that the measured CBR is greater than the preset threshold.

In some embodiments, the active time corresponding to the drx-RetransmissionTimer includes at least one of the following:

in a case that retransmission does not occur, an active time corresponding to the drx-RetransmissionTimer related to retransmission that is predicted to occur for N12 times, N12 being a positive integer;

in a case that retransmission occurs, an active time corresponding to the drx-RetransmissionTimer related to current retransmission;

in a case that retransmission occurs, an active time corresponding to the drx-RetransmissionTimer related to current retransmission and an active time corresponding to a drx-RetransmissionTimer of N13 times of retransmission after the current retransmission, N13 being a positive integer; and in a case that a current service is a cyclic service, at least one of an active time corresponding to a drx-RetransmissionTimer of a current cycle and an active time corresponding to a drx-RetransmissionTimer of N14 cycles after the current cycle, N14 being a positive integer.

In this embodiment, a value of at least one of N12, N13, and N14 may be configured by the network side device, or may be determined by the first terminal, or may be indicated by the second terminal, or may be predefined in a protocol, or the like. For example, the network side device or the first terminal or the second terminal may determine a value of at least one of N12 and N13 based on a maximum number of retransmissions corresponding to a current HARQ process, and the network side device or the first terminal or the second terminal may determine a value of N14 based on a cycle of the current service.

The time unit may include but is not limited to a slot, a symbol, a symbol group, a slot group, or the like.

The active time corresponding to the drx-RetransmissionTimer includes at least one of the active time corresponding to the drx-RetransmissionTimer of the current cycle and the active time corresponding to the drx-RetransmissionTimer of N14 cycles after the current cycle, or the active time corresponding to the drx-RetransmissionTimer includes the active time corresponding to the drx-RetransmissionTimer of the current cycle, or the active time corresponding to the drx-RetransmissionTimer includes the active time corresponding to the drx-RetransmissionTimer of N14 cycles after the current cycle, or the active time corresponding to the drx-RetransmissionTimer includes the active time corresponding to the drx-RetransmissionTimer of the current cycle and the active time corresponding to the drx-RetransmissionTimer of N14 cycles after the current cycle.

In some embodiments, the first information further includes at least one of the following:

first proportion information, where the first proportion information is used for indicating a proportion threshold between a first candidate resource and candidate resources to be reported by the physical layer, and the first candidate resource is a candidate resource that is in the candidate resources to be reported by the physical layer and that is within the active time indicated by the second information; and first indication information, where the first indication information is used for indicating whether the physical layer is allowed to report at least two sets of candidate resources, or the first indication information is used for indicating that the physical layer needs to report at least two sets of candidate resources.

In this embodiment, the proportion threshold may include but is not limited to at least one of a maximum proportion value and a minimum proportion value. The maximum proportion value is used for indicating a maximum proportion of the first candidate resource to the candidate resources to be reported by the physical layer, and the minimum proportion value is used for indicating a maximum proportion of the first candidate resource to the candidate resources to be reported by the physical layer.

For the first information, in a case that the first indication information is used for indicating whether the physical layer is allowed to report at least two sets of candidate resources, if the first indication information allows the physical layer to report at least two sets of candidate resources, the physical layer may report one set of candidate resources, or may report at least two sets of candidate resources; or if the first indication information does not allow the physical layer to report at least two sets of candidate resources, the physical layer may only report one set of candidate resources. In a case that the first indication information is used for indicating that the physical layer needs to report at least two sets of candidate resources, the physical layer usually needs to report at least two sets of candidate resources.

In some embodiments, the selecting, by the higher layer, a transmission resource from the candidate resources reported by the physical layer includes:

selecting, by the higher layer, at least one of an initial transmission resource and a retransmission resource from the candidate resources reported by the physical layer.

In an implementation, the higher layer may select the initial transmission resource only from the candidate resources reported by the physical layer. For example, when a data packet arrives at the logical channel, the MAC layer triggers resource selection and sends the first information to the physical layer, the physical layer selects candidate resources based on the first information and reports the candidate resources to the MAC layer, and then the MAC layer selects the initial transmission resource from the candidate resources reported by the physical layer. In a case that retransmission is required, the MAC layer may trigger resource selection again. In this case, the MAC layer may send the first information to the physical layer again, and the physical layer selects the candidate resources based on the latest first information sent by the MAC layer; or the MAC layer may no longer send the first information to the physical layer, and the physical layer may select the candidate resources based on the first information previously sent by the MAC layer; or the physical layer may directly select the candidate resources without considering the first information.

In another implementation, the higher layer may select the initial transmission resource and the retransmission resource from the candidate resources reported by the physical layer. For example, when there is a data packet arrives at the logical channel, the MAC layer triggers resource selection and sends the first information to the physical layer, the physical layer selects candidate resources based on the first information and reports the candidate resources to the MAC layer, and then the MAC layer selects the initial transmission resource and the retransmission resource from the candidate resources reported by the physical layer.

In another implementation, the higher layer may select the retransmission resource only from the candidate resources reported by the physical layer. For example, in a case that there is a data packet arrives at the logical channel, the higher layer triggers resource selection, the physical layer selects candidate resources and reports the candidate resources to the MAC layer, and then the MAC layer selects the initial transmission resource from the candidate resources reported by the physical layer. In a case that retransmission is required, the MAC layer may trigger resource selection again and sends the first information to the physical layer, the physical layer selects candidate resources based on the first information and reports the candidate resources to the MAC layer, and then the MAC layer selects the retransmission resource from the candidate resources reported by the physical layer.

In some embodiments, the candidate resources reported by the physical layer include two sets of candidate resources; and the selecting, by the higher layer, an initial transmission resource and a retransmission resource from the candidate resources reported by the physical layer includes:

selecting, by the higher layer, the initial transmission resource from one set of candidate resources in the two sets of candidate resources, and selecting the retransmission resource from the other set of candidate resources.

In this embodiment, the physical layer may report two sets of candidate resources. The higher layer may select the initial transmission resource from one set of candidate resources in the two sets of candidate resources, and select the retransmission resource from the other set of candidate resources.

It is to be noted that, after receiving the two sets of candidate resources reported by the physical layer, the higher layer may respectively select a transmission resource from the two sets of candidate resources. For example, the higher layer selects the initial transmission resource from one set of candidate resources in the two sets of candidate resources, and selects the retransmission resource from the other set of candidate resources.

In some embodiments, after receiving the two sets of candidate resources reported by the physical layer, the higher layer may also select M transmission resources from the two sets of candidate resources, and may determine whether each transmission resource is the initial transmission resource or the retransmission resource based on time domain positions of the M transmission resources, where M is a positive integer. For example, first X transmission resources in the M transmission resources are initial transmission resources, and last Y transmission resources are retransmission resources, where both X and Y are positive integers, and a sum of X and Y is M. In some alternative embodiments, the initial transmission resources and retransmission resources in the M transmission resources are arranged at intervals. For example, an $I^{th}$ transmission resource in the M transmission resources is the initial transmission resource, an $(I+1)^{th}$ transmission resource is the retransmission resource, an $(I+2)^{th}$ transmission resource is the initial transmission resource, an $(I+3)^{th}$ transmission resource is the retransmission resource, and so on, I being an integer.

In some embodiments, the candidate resources reported by the physical layer include a first set of candidate resources and a second set of candidate resources, where the first set of candidate resources is used for initial transmission, and the second set of candidate resources is used for retransmission;

or the first set of candidate resources is used for initial transmission, and the second set of candidate resources is used for initial transmission and retransmission;

or the first set of candidate resources is used for initial transmission and retransmission, and the second set of candidate resources is used for retransmission.

In some embodiments, the selecting, by the higher layer, an initial transmission resource and a retransmission resource from the candidate resources reported by the physical layer includes at least one of the following:

in a case that the first set of candidate resources is used for initial transmission and the second set of candidate resources is used for retransmission, selecting, by the higher layer, the initial transmission resource from the first set of candidate resources and selecting the retransmission resource from the second set of candidate resources;

in a case that the first set of candidate resources is used for initial transmission and the second set of candidate resources is used for initial transmission and retransmission, selecting, by the higher layer, the initial transmission resource from the first set of candidate resources and selecting the initial transmission resource and the retransmission resource from the second set of candidate resources; and in a case that the first set of candidate resources is used for initial transmission and retransmission and the second set of candidate resources is used for retransmission, selecting, by the higher layer, the initial transmission resource and the retransmission resource from the first set of candidate resources and selecting the retransmission resource from the second set of candidate resources.

In some embodiments, before the receiving, by the higher layer, candidate resources reported by the physical layer, the method further includes:

triggering, by the higher layer, resource selection at a third moment, where the third moment includes one of the following:

a moment at which a data packet arrives at a logical channel of the first terminal;

a moment of N15 time units after the moment at which the data packet arrives at the logical channel of the first terminal, N15 being a positive integer; and a moment of N16 time units before a start moment of the active time indicated by the second information, N16 being a positive integer.

In this embodiment, a value of at least one of N15 and N16 may be configured by the network side device, or may be determined by the first terminal, or may be indicated by the second terminal, or may be predefined in a protocol, or the like. For example, the network side device or the first terminal or the second terminal may determine the value of at least one of N15 and N16 based on the QoS of the service. The time unit may include but is not limited to a slot, a symbol, a symbol group, a slot group, or the like.

The active time indicated by the second information may be an active time determined based on the second information. For example, if the second information includes the active time corresponding to the drx-onDurationTimer, the active time indicated by the second information may include the active time corresponding to the drx-onDurationTimer.

In some embodiments, the triggering resource selection at a third moment includes:

in a case that a current service is the cyclic service, triggering resource selection of a first cycle at a moment at which the data packet arrives at the logical channel of the first terminal in the first cycle, or triggering resource selection of a first cycle at a moment at which the data packet arrives at the logical channel of the first terminal in a cycle before the first cycle.

In this embodiment, the first cycle may be any cycle, for example, a cycle before the first cycle, which may include any cycle before the first cycle; or a specific cycle before the first cycle, for example, the first cycle is a $K^{th}$ period, and a cycle before the first cycle may be a $(K-J)^{th}$ cycle, where K is a positive integer, and J is an integer less than K.

In some embodiments, before the receiving, by the higher layer, candidate resources reported by the physical layer, the method further includes:

triggering, by the higher layer, resource reselection at a fourth moment, where the fourth moment includes one of the following:

a moment at which the first terminal receives NACK information of the second terminal;

a moment at which the first terminal determines that retransmission needs to be performed and there is no available retransmission resource; and a moment of N17 time units before a start moment of the active time indicated by the second information, N17 being a positive integer.

In this embodiment, a value of N17 may be configured by the network side device, or may be determined by the first terminal, or may be indicated by the second terminal, or may be predefined in a protocol, or the like. For example, the network side device or the first terminal or the second terminal may determine a value of N17 based on the QoS of the service. The time unit may include but is not limited to a slot, a symbol, a symbol group, a slot group, or the like.

The active time indicated by the second information may be an active time determined based on the second information. For example, if the second information includes the active time corresponding to the drx-onDurationTimer, the active time indicated by the second information may include the active time corresponding to the drx-onDurationTimer.

In some embodiments, after the higher layer receives the candidate resources reported by the physical layer, in a case that data transmission needs to be performed on a first logical channel or a first service, the higher layer does not trigger resource reselection if the candidate resources reported by the physical layer are available for the first logical channel or the first service, where a priority of the first logical channel is higher than a priority of a current logical channel of the first terminal, and a priority of the first service is higher than a priority of a current service of the first terminal.

In this embodiment, in a case that there is a logical channel with a higher priority or a service needs to be transmitted, resource reselection may not be triggered as long as a current candidate resource may be used in the transmission.

In some embodiments, the selecting, by the higher layer, a transmission resource from the candidate resources reported by the physical layer includes:

selecting, by the higher layer, the transmission resource from first N18 resources in the candidate resources reported by the physical layer, N18 being a positive integer.

In this embodiment, a value of N18 may be configured by the network side device, or may be determined by the first terminal, or may be indicated by the second terminal, or may be predefined in a protocol, or the like. For example, the network side device or the first terminal or the second terminal may determine a value of N18 based on the QoS of the service.

The first N18 resources in the candidate resources reported by the physical layer may be, for example, top N18 resources that are ranked in the candidate resources reported by the physical layer in chronological order according to the time domain positions.

In some embodiments, the second information includes the active time corresponding to the drx-onDurationTimer, the active time corresponding to the drx-InactivityTimer, and the active time corresponding to the drx-RetransmissionTimer; and the sending, by a higher layer of a first terminal, first information to a physical layer of the first terminal includes:

sending, by the higher layer, the active time corresponding to the drx-onDurationTimer, the active time corresponding to the drx-InactivityTimer, and the active time corresponding to the drx-RetransmissionTimer to the physical layer;

or sending, by the higher layer, the active time corresponding to the drx-onDurationTimer and a first active time to the physical layer, where the first active time is an active time determined according to the active time corresponding to the drx-InactivityTimer and the active time corresponding to the drx-RetransmissionTimer;

or sending, by the higher layer, the active time corresponding to the drx-RetransmissionTimer and a second active time to the physical layer, where the second active time is an active time determined according to the active time corresponding to the drx-onDurationTimer and the active time corresponding to the drx-InactivityTimer;

or sending, by the higher layer, a third active time to the physical layer, where the third active time is an active time determined according to the active time corresponding to the drx-onDurationTimer, the active time corresponding to the drx-InactivityTimer, and the active time corresponding to the drx-RetransmissionTimer.

In this embodiment, the higher layer may use the active time corresponding to the drx-onDurationTimer, the active time corresponding to the drx-InactivityTimer, and the active time corresponding to the drx-RetransmissionTimer as one set of parameters, two sets of parameters, or three sets of parameters to be provided to the physical layer.

In an implementation, the higher layer may separately use the active time corresponding to the drx-onDurationTimer, the active time corresponding to the drx-InactivityTimer, and the active time corresponding to the drx-RetransmissionTimer as three sets of parameters to be provided to the physical layer. For example, the active time corresponding to the sl-drx-onDurationTimer is separately provided, the active time corresponding to the sl-DRXInactivityTimer is separately provided, and the active time corresponding to the sl-drx-RetransmissionTimer is separately provided.

In another implementation, the higher layer may separately use the active time corresponding to the drx-onDurationTimer, the active time corresponding to the drx-InactivityTimer, and the active time corresponding to the drx-RetransmissionTimer as two sets of parameters to be provided to the physical layer. For example, the active time corresponding to the sl-drx-onDurationTimer is separately provided, the active time corresponding to the sl-DRXInactivityTimer and the active time corresponding to the sl-drx-RetransmissionTimer are combined into one active time to be provided; or the active time corresponding to the sl-drx-RetransmissionTimer is separately provided, the active time corresponding to the sl-drx-onDurationTimer and the active time corresponding to the sl-DRXInactivityTimer are combined into one active time to be provided.

In another implementation, the higher layer may separately use the active time corresponding to the drx-onDurationTimer, the active time corresponding to the drx-InactivityTimer, and the active time corresponding to the drx-RetransmissionTimer as one set of parameters to be provided to the physical layer. For example, the active time corresponding to the sl-drx-onDurationTimer, the active time corresponding to the sl-DRXInactivityTimer, and the active time corresponding to the sl-drx-RetransmissionTimer are combined into one active time to be provided.

It is to be noted that, the implementations may be properly combined according to actual requirements. For example, the implementation in which the higher layer of the first terminal triggers resource selection at the third moment and the implementation in which the higher layer of the first terminal sends the first information to the physical layer of the first terminal in a case that the first terminal trigger resource selection may be combined. In other words, when the higher layer of the first terminal triggers resource selection at the third moment, the higher layer of the first terminal sends the first information to the physical layer of the first terminal. This is not listed in this embodiment of this application one by one.

Based on the above, in the resource selection method provided in the embodiments of this application, a behavior by the MAC layer to provide the active time to the physical layer may be considered as that resource selection is triggered, or the MAC layer provides the active time to the physical layer only when resource selection is performed, or the MAC layer may provide the active time to the physical layer at any time, but the physical layer needs to select candidate resources based on the latest active time only in a case that resource selection is triggered.

Secondly, whether the MAC layer provides the active time to the physical layer may depend on a cast type of the current service, a resource selection manner of the current resource pool (for example, full sensing, partial sensing, random selection, and the like), and a priority of the current service, whether the physical layer previously has fed back the candidate resources, and the like. The physical layer may also hand over between various resource selection manners (for example, full sensing, partial sensing, random selection, and the like) based on the active time provided by the MAC layer.

Finally, when providing the active time corresponding to the sl-DRXInactivityTimer or the active time corresponding to the sl-drx-RetransmissionTimer, the MAC layer may provide the active time to the physical layer based on a real-time update active time. For example, the active time may be provided to the physical layer after a related timer is determined, or the active time may be provided to the physical layer based on a prediction situation, for example, the active time corresponding to the sl-drx-Retransmission-Timer of retransmission that is predicted to occur is provided to the physical layer. In addition, how far the active time needs to be provided to the physical layer in advance may be flexibly configured. The higher layer may further configure resource selection-related parameters of the physical layer, for example, a proportion of candidate resources within the active time, whether there is a need to provide a plurality of sets of candidate resources, and the like. A plurality of sets of candidate resources may also be provided when the MAC layer provides the active time. Whether the MAC layer triggers resource selection or reselection and triggering time points may also be different and change flexibly.

Figures 5, 6:
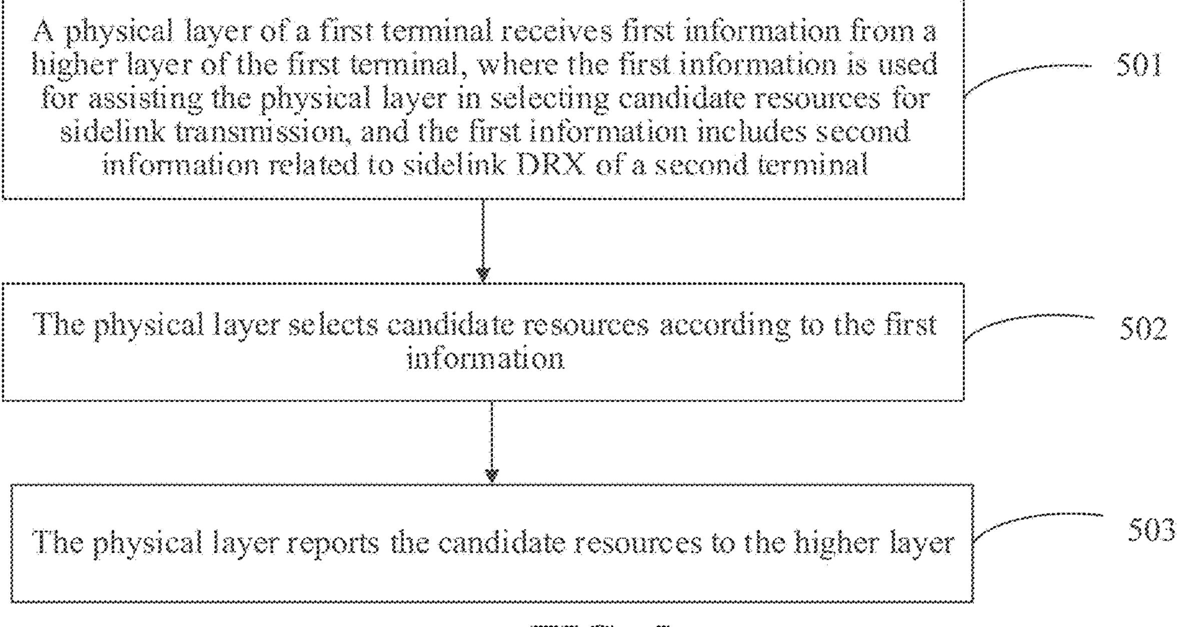
FIG. 5 is a flowchart of another resource selection method according to an embodiment of this application.
FIG. 6 is a structural diagram of a resource selection apparatus according to an embodiment of this application.

Refer to FIG. 5. FIG. 5 is a flowchart of another resource selection method according to an embodiment of this application. The method may be performed by a physical layer of a first terminal. As shown in FIG. 5, the method includes the following steps.

Step 501: A physical layer of a first terminal first information from a higher layer of the first terminal, where the first information is used for assisting the physical layer in selecting candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time.

In this embodiment, the higher layer of the first terminal may be relative to the physical layer of the first terminal. For example, the higher layer of the first terminal may include a MAC layer, an RLC layer, an RRC layer, or the like.

The second terminal is the peer terminal for the first terminal to perform sidelink transmission. For example, the first terminal is the TX UE on the sidelink, and the second terminal is the RX UE on the sidelink. There may be one or more second terminals, that is, the first information may include second information of one or more second terminals.

The DRX configuration information may include but is not limited to at least one of an sl-drx-StartOffset, an sl-drx-Cycle, an sl-drx-onDurationTimer, an sl-drx-SlotOffset, an sl-DRXInactivityTimer, an sl-drx-Retransmission-Timer, and the like.

The at least part of the DRX configuration information may include all configuration information of the DRX configuration information that is for sidelink transmission by the second terminal and that is received by the first terminal. For example, the higher layer of the first terminal may directly transmit, to the physical layer of the first terminal, the DRX configuration information that is for sidelink transmission by the second terminal and that is received by the network side device or the second terminal. In some alternative embodiments, the at least part of the DRX configuration information may only include configuration information that is in the DRX configuration information and that is related to the active time. For example, the at least part of the DRX configuration information may only include configuration information that is in the DRX configuration information and that is related to at least one of the active time corresponding to the drx-onDurationTimer, the active time corresponding to the drx-InactivityTimer, and the active time corresponding to the drx-Retransmission-Timer.

The drx-onDurationTimer for sidelink transmission may also be referred to as the sl-drx-onDurationTimer. The drx-InactivityTimer for sidelink transmission may also be referred to as the sl-DRXInactivityTimer. The drx-RetransmissionTimer for sidelink transmission may also be referred to as the sl-drx-RetransmissionTimer.

The active time corresponding to the drx-InactivityTimer may include an active time determined based on a real-time update result. For example, the active time corresponding to the drx-InactivityTimer may include an active time corresponding to the sl-DRXInactivityTimer of SCI scheduling that actually occurs. The active time corresponding to the drx-InactivityTimer may also include an active time determined based on a prediction result. For example, the active time corresponding to the drx-InactivityTimer may include an active time corresponding to the sl-DRXInactivityTimer of SCI scheduling that is predicted to occur.

The active time corresponding to the drx-Retransmission-Timer may include an active time determined based on a real-time update result. For example, the active time corresponding to the drx-RetransmissionTimer may include an active time corresponding to the sl-drx-Retransmission-Timer of retransmission that actually occurs. The active time corresponding to the drx-RetransmissionTimer may include an active time determined based on a prediction result. For example, the active time corresponding to the drx-RetransmissionTimer may include an active time corresponding to the sl-drx-RetransmissionTimer of retransmission that is predicted to occur.

For the number of cycles of the active time, in a cyclic service, resource selection may be performed in consideration of the number of cycles of the active time.

In some embodiments, the first information further includes at least one of the following:

- first proportion information, where the first proportion information is used for indicating a proportion threshold between a first candidate resource and candidate resources to be reported by the physical layer, and the first candidate resource is a candidate resource that is in the candidate resources to be reported by the physical layer and that is within the active time indicated by the second information; and
- first indication information, where the first indication information is used for indicating whether the physical layer is allowed to report at least two sets of candidate resources, or the first indication information is used for indicating that the physical layer needs to report at least two sets of candidate resources.

Step 502: The physical layer selects candidate resources according to the first information.

For example, the physical layer may select candidate resources based on the active time indicated by the second information in the first information, so that the selected candidate resources are at least partially within the active time indicated by the second information.

Step 503: The physical layer reports the candidate resources to the higher layer.

In this embodiment, the physical layer may report one or more sets of candidate resources. For example, the physical layer may report two sets of candidate resources. One set of candidate resources is used for selecting an initial transmission resource, and the other set of candidate resources is used for selecting a retransmission resource. In this way, the higher layer may select a transmission resource from the candidate resources reported by the physical layer, and may transmit data to the second terminal by using the selected transmission resource.

In the resource selection method provided in the embodiments of this application, the physical layer of the first terminal receives the second information related to sidelink DRX of the second terminal from the higher layer of the first terminal, and may select candidate resources based on the active time indicated by the received second information and report the candidate resources to the higher layer of the first terminal. In this way, when the higher layer of the first terminal selects the transmission resource from the candidate resources reported by the physical layer to transmit data to the second terminal, data transmission failure may be reduced, thereby improving stability of data transmission.

In some embodiments, the selecting, by the physical layer, candidate resources according to the first information includes:

- selecting, by the physical layer, the candidate resources according to the first information when the higher layer triggers resource selection or resource reselection;

or

- selecting, by the physical layer, the candidate resources according to the first information when the physical layer receives the first information.

In an implementation, the physical layer may trigger candidate resource selection every time the higher layer triggers resource selection or resource reselection, that is, candidate resources may be selected based on the first information received from the higher layer every time the higher layer triggers resource selection or resource reselection.

In another implementation, the physical layer may trigger candidate resource selection every time the physical layer receives the first information provided by the higher layer, that is, candidate resources are selected based on the received first information every time the first information provided by the higher layer is received.

In some embodiments, the selecting, by the physical layer, candidate resources according to the first information includes:

determining, by the physical layer, a resource selection manner according to at least one of content of the first information and a moment at which the first information is received; and selecting, by the physical layer, the candidate resources according to the resource selection manner and the first information.

The resource selection manner may include but is not limited to at least one of the following: full sensing, periodic partial sensing, contiguous partial sensing, periodic partial sensing AND contiguous partial sensing, and random detection.

For example, if the first information includes the active time corresponding to the drx-InactivityTimer or the active time corresponding to the drx-RetransmissionTimer, the resource selection manner is full sensing. If the first information only includes the active time corresponding to the drx-onDurationTimer, the resource selection manner may be any one of full sensing, periodic partial sensing, contiguous partial sensing, and periodic partial sensing AND contiguous partial sensing. If a time point of receiving the first information is too late to have enough detection samples, the resource selection manner may be random selection.

In some embodiments, when the higher layer provides a plurality of sets of active times, the physical layer may also report a plurality of sets of candidate resources to the higher layer.

It is to be noted that, this embodiment is used as an implementation of a corresponding physical layer-side device in the embodiment shown in FIG. 4. For a specific implementation of this embodiment, refer to related descriptions in the embodiment shown in FIG. 4, and the same effects are achieved. To avoid repeated descriptions, details are not described again in this embodiment.

This embodiment of this application is described below by using examples:

Example 1: The active time corresponding to sl-drx-onDurationTimer is provided in this example, and the candidate resources reported by the physical layer are used for selecting an initial transmission resource and a retransmission resource.

In some embodiments, the resource selection method provided in this example may include the following steps:

Step a0: The MAC layer of the TX UE provides the physical layer with the active time corresponding to the sl-drx-onDurationTimer obtained based on DRX configuration of at least one peer RX UE.

Step a1: Data arrives at the logical channel, and the MAC layer triggers resource selection.

In some embodiments, the MAC layer may also provide the physical layer with one piece of proportion information (that is, the first ratio information). The proportion information is used for indicating at least what proportion of the candidate resources subsequently reported to the physical layer is within the active time provided by the MAC layer.

It is to be noted that, step a0 and step a1 may be executed in any order, for example, may be executed simultaneously or sequentially. This is not limited in this example.

Step a2: The physical layer selects candidate resources based on the active time provided by the MAC layer, and provides the selected candidate resources to the MAC layer.

Step a3: The MAC layer further selects, from the candidate resources, resources for initial transmission and/or retransmission.

In some embodiments, the MAC layer may trigger resource reselection if the MAC layer finds that requirements cannot be met when selecting a retransmission resource from the candidate resources, for example, all the selectable retransmission resources are not within the active time provided by the MAC layer.

Example 2: The active time corresponding to the sl-DRXInactivityTimer is provided in this example.

In some embodiments, the resource selection method provided in this example may include the following steps.

Step b0: The MAC layer of the TX UE provides the physical layer with the active time corresponding to the sl-DRXInactivityTimer obtained based on DRX configuration of at least one peer RX UE.

Step b1: Data arrives at the logical channel, and the MAC layer triggers resource selection. The physical layer selects candidate resources based on the active time provided by the MAC layer, and provides the selected candidate resources to the MAC layer. The MAC layer further selects, from the candidate resources, resources for initial transmission and/or retransmission.

In some embodiments, the MAC layer may also provide the physical layer with one piece of proportion information (that is, the first ratio information). The proportion information is used for indicating at least what proportion of the candidate resources subsequently reported to the physical layer is within the active time provided by the MAC layer.

It is to be noted that, step b0 and step b1 may be executed in any order, for example, may be executed simultaneously or sequentially. This is not limited in this example.

Step b2: After the TX UE sends SCI indicating initial transmission at each time, the sl-DRXInactivityTimer on a side of the TX UE is started, and the updated active time is notified to the physical layer.

Step b3: Data arrives at the logical channel again, and the MAC layer triggers resource selection.

Step b4: The physical layer selects candidate resources based on the latest active time and provides the candidate resources to the MAC layer.

Step b5: The MAC layer further selects, from the candidate resources, resources for initial transmission and/or retransmission.

Example 3: The active time corresponding to the sl-drx-RetransmissionTimer is provided in this example.

Case 1:

Step c1: Data arrives at the logical channel, and the MAC layer triggers resource selection.

In some embodiments, the MAC layer may also provide the physical layer with one piece of proportion information (that is, the first ratio information). The proportion information is used for indicating at least what proportion of the candidate resources subsequently reported to the physical layer is within the active time provided by the MAC layer.

Step c2: The physical layer feeds back candidate resources, and the MAC layer further selects, from the candidate resources, resources for initial transmission and/or retransmission.

Step c3: The TX UE sends data.

Step c4: The TX UE receives NACK fed back by the peer RX UE, the TX UE starts the sl-drx-RetransmissionTimer on a TX side and notifies the physical layer of an active time corresponding to a retransmission location, where the active time may be immediately notified or may be notified on N symbol/slots before start of the active time.

Step c5: The physical layer selects candidate resources based on the latest retransmission-related active time provided by the MAC layer, and provides the candidate resources to the MAC layer.

Step c6: The MAC layer selects resources for initial transmission and/or retransmission based on the candidate resources fed back by the physical layer.

Case 2:

Step d0: The MAC layer of the TX UE provides the physical layer with the active time corresponding to the sl-drx-RetransmissionTimer obtained based on DRX configuration of at least one peer RX UE. The active time includes information of retransmission expected to be performed for N times and a corresponding active time.

Step d1: Data arrives at the logical channel, and the MAC layer triggers resource selection.

In some embodiments, the MAC layer may also provide the physical layer with one piece of proportion information (that is, the first ratio information). The proportion information is used for indicating at least what proportion of the candidate resources subsequently reported to the physical layer is within the active time provided by the MAC layer.

It is to be noted that, step d0 and step d1 may be executed in any order, for example, may be executed simultaneously or sequentially. This is not limited in this example.

Step d2: The physical layer feeds back candidate resources, and the MAC layer further selects, from the candidate resources, resources for initial transmission and/or retransmission.

Step d3: The TX UE sends data.

As can be seen from the above, in the resource selection method provided in the embodiments of this application, the MAC layer provides an appropriate active time for the physical layer to assist the physical layer in selecting candidate resources, so that the candidate resources are provided more properly, to avoid occurrence of no resources available for transmission.

It is to be noted that, an execution entity of the resource selection method provided in the embodiments of this application may be a resource selection apparatus, or may be a control module in the resource selection apparatus for performing the resource selection method. The resource selection apparatus provided in the embodiments of this application is described in the embodiments of this application by using an example in which the resource selection apparatus performs the resource selection method.

Refer to FIG. 6. FIG. 6 is a structural diagram of a resource selection apparatus according to an embodiment of this application. Referring to FIG. 6, the resource selection apparatus 600 includes:

- a first sending module 601, configured to send first information to a physical layer of a first terminal, where the first information is used for assisting the physical layer in selecting candidate resources for sidelink transmission, the first information includes second information related to sidelink discontinuous reception DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time;
- a first receiving module 602, configured to receive candidate resources reported by the physical layer; and
- a first selection module 603, configured to select a transmission resource from the candidate resources reported by the physical layer.

In some embodiments, the second information includes the at least part of the DRX configuration information; and the first sending module is configured to:

send the first information to the physical layer in a case that a first condition is met, where the first condition includes at least one of the following:

the DRX configuration information changes; and the first terminal triggers resource selection, the first terminal triggers resource reselection, or the first terminal triggers any one of resource selection and resource reselection.

In some embodiments, the second information includes the active time corresponding to the drx-onDurationTimer; and the first sending module is configured to:

send the first information to the physical layer in a case that a second condition is met, where the second condition includes at least one of the following:

the DRX configuration information changes;

the first terminal triggers resource selection, the first terminal triggers resource reselection, or the first terminal triggers any one of resource selection and resource reselection;

a current service is a broadcast service, a current service is a groupcast service, a current service is a unicast service, or a current service is any one of at least two services of a broadcast service, a groupcast service, and a unicast service;

a condition for triggering resource selection is met, a condition for triggering resource reselection is met, or any one of a condition for triggering resource selection and a condition for triggering resource reselection is met;

after the first information is previously sent to the physical layer, the physical layer has not fed back the candidate resources or the physical layer has fed back the candidate resources;

a priority of the current service is higher than a priority of a service when the first information is previously sent to the physical layer; and a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection.

In some embodiments, the second information includes the active time corresponding to the drx-InactivityTimer; and the first sending module is configured to:

send the first information to the physical layer in a case that a third condition is met, where the third condition includes at least one of the following:

the DRX configuration information changes;

the first terminal triggers resource selection, the first terminal triggers resource reselection, or the first terminal triggers any one of resource selection and resource reselection;

the first terminal performs sidelink control information SCI scheduling for N1 times, N1 being a positive integer;

the first terminal starts an inactivity timer of the first terminal;

a current service is a groupcast service, a current service is a unicast service, or a current service is any one of a groupcast service and a unicast service;

a condition for triggering resource selection is met, a condition for triggering resource reselection is met, or any one of a condition for triggering resource selection and a condition for triggering resource reselection is met;

after the first information is previously sent to the physical layer, the physical layer has not fed back the candidate resources or the physical layer has fed back the candidate resources;

a priority of the current service is higher than a priority of a service when the first information is previously sent to the physical layer; and a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection.

In some embodiments, the second information includes the active time corresponding to the drx-InactivityTimer; and the first sending module is configured to:

send the first information to the physical layer at a first moment, where the first moment includes at least one of the following:

a moment of N2 time units before the first terminal predicts to perform SCI scheduling, N2 being a positive integer;

a moment of N3 time units after the first terminal actually performs SCI scheduling, N3 being a positive integer; and a moment of N4 time units before the first terminal starts an inactivity timer of the first terminal, N4 being a positive integer.

In some embodiments, the active time corresponding to the drx-InactivityTimer includes at least one of the following:

in a case that sidelink control information SCI scheduling does not occur, an active time corresponding to the drx-InactivityTimer related to SCI scheduling that is predicted to occur for N5 times, N5 being a positive integer;

in a case that SCI scheduling occurs, an active time corresponding to the drx-InactivityTimer related to current SCI scheduling;

in a case that SCI scheduling occurs, an active time corresponding to the drx-InactivityTimer related to current SCI scheduling and an active time corresponding to the drx-InactivityTimer related to N6 times of SCI scheduling after the current SCI scheduling, N6 being a positive integer; and in a case that a current service is a cyclic service, at least one of an active time corresponding to a drx-InactivityTimer of a current cycle and an active time corresponding to a drx-InactivityTimer of N7 cycles after the current cycle, N7 being a positive integer.

In some embodiments, the second information includes the active time corresponding to the drx-Retransmission-Timer; and the first sending module is configured to:

send the first information to the physical layer in a case that a fourth condition is met, where the fourth condition includes at least one of the following:

the DRX configuration information changes;

the first terminal triggers resource selection, the first terminal triggers resource reselection, or the first terminal triggers any one of resource selection and resource reselection;

the first terminal receives negative acknowledgement NACK information of the second terminal for N8 times, N8 being a positive integer;

the first terminal starts a retransmission timer of the first terminal;

a current service is a groupcast service, a current service is a unicast service, or a current service is any one of a groupcast service and a unicast service;

a condition for triggering resource selection is met, a condition for triggering resource reselection is met, or any one of a condition for triggering resource selection and a condition for triggering resource reselection is met;

after the first information is previously sent to the physical layer, the physical layer has not fed back the candidate resources or the physical layer has fed back the candidate resources;

a priority of the current service is higher than a priority of a service when the first information is previously sent to the physical layer;

a currently selected resource pool is configured as full sensing, a currently selected resource pool is configured as partial sensing, a currently selected resource pool is configured as random selection, or a currently selected resource pool is configured as any one of at least two resource selection manners of full sensing, partial sensing, and random selection;

a physical sidelink feedback channel PSFCH is configured for a currently selected resource pool, or a PSFCH is not configured for a currently selected resource pool; and a hybrid automatic repeat request HARQ attribute of a current logical channel is enabled, or a HARQ attribute of a current logical channel is disabled.

In some embodiments, the second information includes the active time corresponding to the drx-Retransmission-Timer; and the first sending module is configured to:

send the first information to the physical layer at a second moment, where the second moment includes at least one of the following:

a moment of N9 time units before the first terminal predicts previous transmission failure, N9 being a positive integer;

a moment of N10 time units after the first terminal previously fails in transmission, N10 being a positive integer; and a moment of N11 time units before the first terminal starts a retransmission timer of the first terminal, N11 being a positive integer.

In some embodiments, the active time corresponding to the drx-RetransmissionTimer includes at least one of the following:

in a case that retransmission does not occur, an active time corresponding to the drx-RetransmissionTimer related to retransmission that is predicted to occur for N12 times, N12 being a positive integer;

in a case that retransmission occurs, an active time corresponding to the drx-RetransmissionTimer related to current retransmission;

in a case that retransmission occurs, an active time corresponding to the drx-RetransmissionTimer related to current retransmission and an active time corresponding to a drx-RetransmissionTimer of N13 times of retransmission after the current retransmission, N13 being a positive integer; and in a case that a current service is a cyclic service, at least one of an active time corresponding to a drx-RetransmissionTimer of a current cycle and an active time corresponding to a drx-RetransmissionTimer of N14 cycles after the current cycle, N14 being a positive integer.

In some embodiments, the first information further includes at least one of the following:

first proportion information, where the first proportion information is used for indicating a proportion threshold between a first candidate resource and candidate resources to be reported by the physical layer, and the first candidate resource is a candidate resource that is in the candidate resources to be reported by the physical layer and that is within the active time indicated by the second information; and first indication information, where the first indication information is used for indicating whether the physical layer is allowed to report at least two sets of candidate resources, or the first indication information is used for indicating that the physical layer needs to report at least two sets of candidate resources.

In some embodiments, the first selection module is configured to:

select at least one of an initial transmission resource and a retransmission resource from the candidate resources reported by the physical layer.

In some embodiments, the candidate resources reported by the physical layer include two sets of candidate resources; and the first selection module is configured to:

select the initial transmission resource from one set of candidate resources in the two sets of candidate resources, and select the retransmission resource from the other set of candidate resources.

In some embodiments, the candidate resources reported by the physical layer include a first set of candidate resources and a second set of candidate resources, where the first set of candidate resources is used for initial transmission, and the second set of candidate resources is used for retransmission;

or the first set of candidate resources is used for initial transmission, and the second set of candidate resources is used for initial transmission and retransmission;

or the first set of candidate resources is used for initial transmission and retransmission, and the second set of candidate resources is used for retransmission.

In some embodiments, the apparatus further includes:

a first triggering module, configured to trigger resource selection at a third moment before the candidate resources reported by the physical layer are received, where the third moment includes one of the following:

a moment at which a data packet arrives at a logical channel of the first terminal;

a moment of N15 time units after the moment at which the data packet arrives at the logical channel of the first terminal, N15 being a positive integer; and a moment of N16 time units before a start moment of the active time indicated by the second information, N16 being a positive integer.

In some embodiments, the first triggering module is configured to:

in a case that a current service is the cyclic service, trigger resource selection of a first cycle at a moment at which the data packet arrives at the logical channel of the first terminal in the first cycle, or trigger resource selection of a first cycle at a moment at which the data packet arrives at the logical channel of the first terminal in a cycle before the first cycle.

In some embodiments, the apparatus further includes:

a second triggering module, configured to trigger resource reselection at a fourth moment before the candidate resources reported by the physical layer are received, where the fourth moment includes one of the following:

a moment at which the first terminal receives NACK information of the second terminal;

a moment at which the first terminal determines that retransmission needs to be performed and there is no available retransmission resource; and a moment of N17 time units before a start moment of the active time indicated by the second information, N17 being a positive integer.

In some embodiments, after a transmission resource is selected from the candidate resources reported by the physical layer, in a case that data transmission needs to be performed on a first logical channel or a first service, the resource selection apparatus does not trigger resource reselection if the transmission resources selected by the resource selection apparatus are available for the first logical channel or the first service, where a priority of the first logical channel is higher than a priority of a current logical channel of the first terminal, and a priority of the first service is higher than a priority of a current service of the first terminal.

In some embodiments, the first selection module is configured to:

select the transmission resource from first N18 resources in the candidate resources reported by the physical layer, N18 being a positive integer.

In some embodiments, the second information includes the active time corresponding to the drx-onDurationTimer, the active time corresponding to the drx-InactivityTimer, and the active time corresponding to the drx-RetransmissionTimer; and the first sending module is configured to:

send the active time corresponding to the drx-onDurationTimer, the active time corresponding to the drx-InactivityTimer, and the active time corresponding to the drx-RetransmissionTimer to the physical layer;

or send the active time corresponding to the drx-onDurationTimer and a first active time to the physical layer, where the first active time is an active time determined according to the active time corresponding to the drx-InactivityTimer and the active time corresponding to the drx-RetransmissionTimer;

or send the active time corresponding to the drx-RetransmissionTimer and a second active time to the physical layer, where the second active time is an active time determined according to the active time corresponding to the drx-onDurationTimer and the active time corresponding to the drx-InactivityTimer;

or send a third active time to the physical layer, where the third active time is an active time determined according to the active time corresponding to the drx-onDurationTimer, the active time corresponding to the drx-InactivityTimer, and the active time corresponding to the drx-RetransmissionTimer.

The resource selection apparatus in the embodiments of this application may be an apparatus, an apparatus or electronic device with an operating system, or may be a component, an integrated circuit, or a chip in the first terminal. The apparatus or the electronic device may be a mobile terminal or may be a non-mobile terminal. Exemplarily, the mobile terminal may include but is not limited to a type of the first terminal 11 listed above, and the non-mobile terminal may be a server, a Network Attached Storage (NAS), a Personal Computer (PC), a Television (TV), a teller machine, a self-service machine, or the like. This is not specifically limited in the embodiments of this application.

The resource selection apparatus provided in the embodiments of this application can implement the processes implemented in the method embodiment of FIG. 4 and achieve the same technical effect. To avoid repetition, details are not described herein again.

Figure 7:
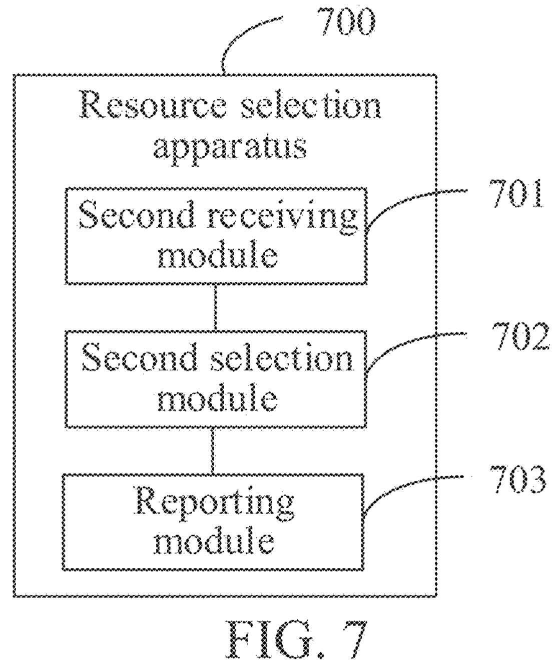
FIG. 7 is a structural diagram of another resource selection apparatus according to an embodiment of this application.

Refer to FIG. 7. FIG. 7 is a structural diagram of a resource selection apparatus according to an embodiment of this application. Referring to FIG. 7, the resource selection apparatus 700 includes:

a second receiving module 701, configured to receive first information from a higher layer of a first terminal, where the first information is used for a physical layer of the first terminal to select candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time;

a second selection module 702, configured to select candidate resources according to the first information; and a reporting module 703, configured to report the candidate resources to the higher layer.

In some embodiments, the second selection module is configured to:

select the candidate resources according to the first information when the higher layer triggers resource selection or resource reselection;

or select the candidate resources according to the first information when the first information is received.

In some embodiments, the second selection module is configured to:

determine a resource selection manner according to at least one of content of the first information and a moment at which the first information is received; and select the candidate resources according to the resource selection manner and the first information.

The resource selection apparatus in the embodiments of this application may be an apparatus, an apparatus or electronic device with an operating system, or may be a component, an integrated circuit, or a chip in the first terminal. The apparatus or the electronic device may be a mobile terminal or may be a non-mobile terminal. Exemplarily, the mobile terminal may include but is not limited to a type of the first terminal 11 listed above, and the non-mobile terminal may be a server, an NAS, a Personal Computer (PC), a Television (TV), a teller machine, a self-service machine, or the like. This is not specifically limited in the embodiments of this application.

The resource selection apparatus provided in the embodiments of this application can implement the processes implemented in the method embodiment of FIG. 5 and achieve the same technical effect. To avoid repetition, details are not described herein again.

Figure 8:
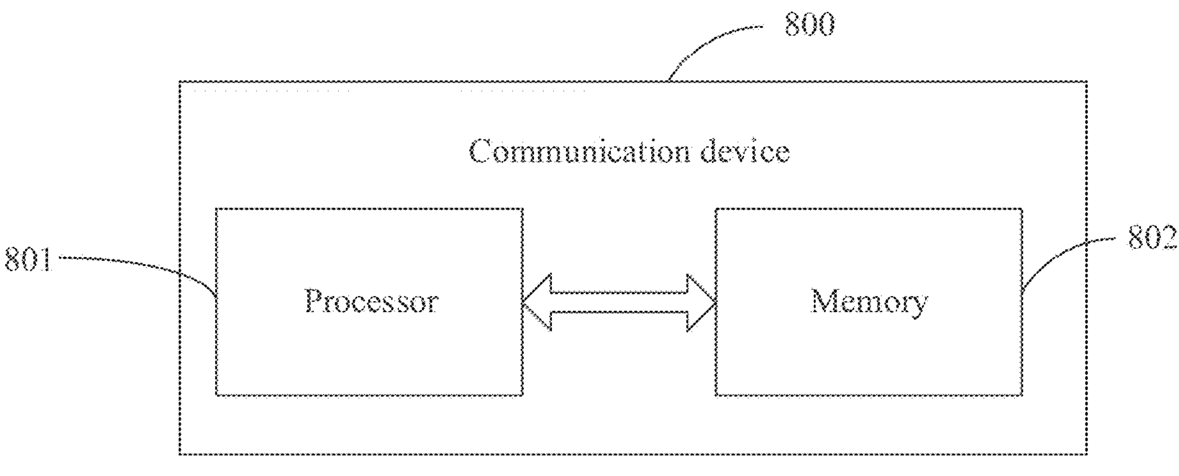
FIG. 8 is a structural diagram of a communication device according to an embodiment of this application.

In some embodiments, as shown in FIG. 8, an embodiment of this application further provides a communication device 800, including a processor 801, a memory 802, and a program or instructions stored in the memory 802 and executable on the processor 801. For example, when the communication device 800 is a first terminal, the program or instructions are executed by the processor 801 to implement the processes of the embodiments of the resource selection method, and the same technical effects can be achieved. To avoid repetition, details are not described herein again.

An embodiment of this application further provides a first terminal, including a processor and a communication interface, where the processor is configured to send, by a higher layer of the first terminal, first information to a physical layer of the first terminal, where the first information is used for assisting the physical layer in selecting candidate resources for sidelink transmission, the first information includes second information related to sidelink discontinuous reception DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time; the processor is further configured to receive, by the higher layer, candidate resources reported by the physical layer; the processor is further configured to select, by the higher layer, a transmission resource from the candidate resources reported by the physical layer;

and/or the processor is configured to receive, by a physical layer of the first terminal, first information from a higher layer of the first terminal, where the first information is used for assisting the physical layer in selecting candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time; the processor is further configured to select, by the physical layer, candidate resources according to the first information; and the processor is further configured to report, by the physical layer, the candidate resources to the higher layer.

Figure 9:
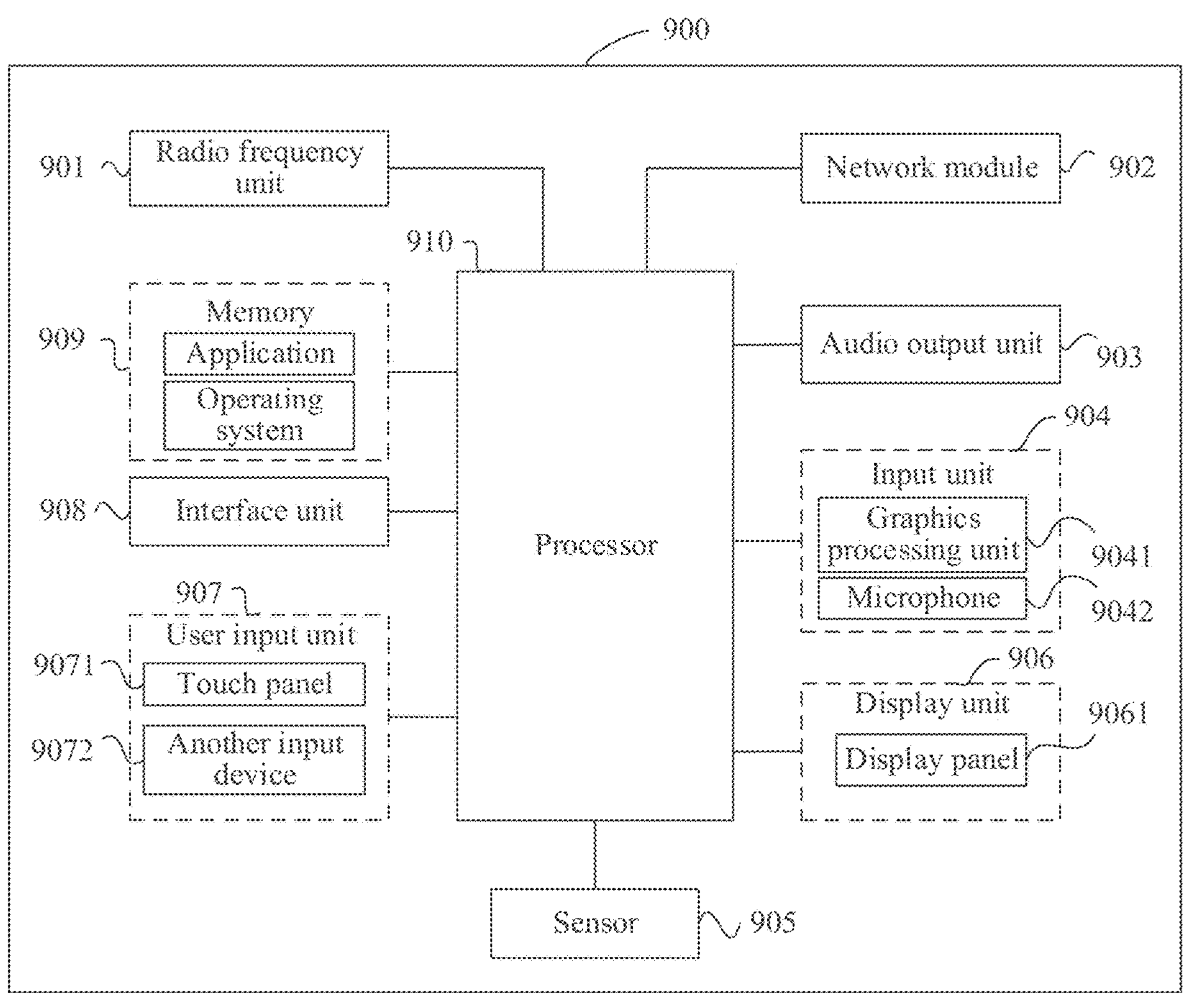
FIG. 9 is a structural diagram of a first terminal according to an embodiment of this application.

The embodiment of the first terminal corresponds to the embodiment of the method of the first terminal. All implementation processes of the method embodiment are applicable to the embodiment of the first terminal and can achieve the same technical effects. For example, FIG. 9 is a schematic diagram of a hardware structure of a first terminal implementing an embodiment of this application.

The first terminal 900 includes, but is not limited to, at least some components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that, the first terminal 900 may further include a power supply (such as a battery) for supplying power to the components. In some embodiments, the power supply may be logically connected to the processor 910 by using a power management system, thereby implementing functions such as charging, discharging, and power consumption management by using the power management system. A structure of the first terminal shown in FIG. 9 does not constitute a limitation to the first terminal, and the first terminal may include more or fewer components than those shown in the figure, or some components may be combined, or a different component deployment may be used. Details are not described herein again.

It may be understood that, in the embodiments of this application, the input unit 904 may include a Graphics Processing Unit (GPU) 9041 and a microphone 9042. The graphics processing unit 9041 processes image data of a static picture or a video obtained by an image capturing apparatus (for example, a camera) in a video capturing mode or an image capturing mode. The display unit 906 may include a display panel 9061, for example, a display panel 9061 configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include, but is not limited to, a physical keyboard, a functional key (such as a volume control key or a switch key), a track ball, a mouse, and a joystick, and the details will not be described herein again.

In this embodiment of this application, the radio frequency unit 901 receives downlink data from a network side device and sends the data to the processor 910 for processing; and sends uplink data to the network side device. Generally, the radio frequency unit 91 includes, but is not limited to, an antenna, at least one amplifier, a transceiver, a coupler, a low noise amplifier, a duplexer, and the like.

The memory 909 may be configured to store a software program or instructions and various data. The memory 909 may mainly include a program storage or instruction area and a data storage area. The program storage or instruction area may store an operating system, an application program or instructions required by at least one function (for example, a sound playback function and an image playback function), or the like. In addition, the memory 909 may include a high speed RAM, and may further include a non-volatile memory. The non-volatile memory may be a Read-Only Memory (ROM), a Programmable ROM (PROM), an Erasable PROM (EPROM), an Electrically EPROM (EEPROM), or a flash memory. For example, at least one magnetic disk storage device, a flash memory device, or another non-volatile solid-state storage device.

The processor 910 may include one or more processing units. In some embodiments, the processor 910 may integrate an application processor and a modem processor. The application processor mainly processes an operating system, a user interface, an application program or instructions, and the like. The modem processor mainly processes wireless communication, for example, a baseband processor. It may be understood that the modulation and demodulation processor may not be integrated into the processor 910.

The processor 910 is configured to send, by a higher layer of a first terminal, first information to a physical layer of the first terminal, where the first information is used for assisting the physical layer in selecting candidate resources for sidelink transmission, the first information includes second information related to sidelink discontinuous reception DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time; receiving, by the higher layer, candidate resources reported by the physical layer; and select, by the higher layer, a transmission resource from the candidate resources reported by the physical layer;

and/or the processor 910 is configured to receive, by a physical layer of a first terminal, first information from a higher layer of the first terminal, where the first information is used for assisting the physical layer in selecting candidate resources for sidelink transmission, the first information includes second information related to sidelink DRX of a second terminal, the second terminal is a peer terminal for the first terminal to perform sidelink transmission, and the second information includes at least one of the following: at least part of DRX configuration information, an active time corresponding to a drx-onDurationTimer, an active time corresponding to a drx-InactivityTimer, an active time corresponding to a drx-RetransmissionTimer, and a number of cycles of the active time; selecting, by the physical layer, candidate resources according to the first information; and reporting, by the physical layer, the candidate resources to the higher layer.

In the embodiments of this application, the higher layer of the first terminal sends, to physical layer of the first terminal, the second information related to sidelink DRX of the second terminal, so that the physical layer of the first terminal may select candidate resources more properly based on the active time indicated by the received second information and report the candidate resources to the higher layer of the first terminal. In this way, when the higher layer of the first terminal selects the transmission resource from the candidate resources reported by the physical layer to transmit data to the second terminal, data transmission failure may be reduced, thereby improving stability of data transmission.

It may be understood that, in the embodiments of this application, the processor 910 can implement the processes implemented by the higher layer of the first terminal and/or the physical layer of the first terminal in the foregoing method embodiments. To avoid repetition, details are not described herein again.

An embodiment of this application further provides a readable storage medium. The readable storage medium may be volatile or non-volatile. The readable storage medium stores a program or instructions, the program or instructions, when executed by a processor, implementing the processes of the embodiments of the resource selection method on a side of the higher layer of the first terminal and/or the processes of the embodiments of the resource selection method on a side of the physical layer of the first terminal, and achieving the same technical effect. To avoid repetition, details are not described herein again.

The processor is a processor in the first terminal in the foregoing embodiments. The readable storage medium includes a computer-readable storage medium, for example, a ROM), a Random Access Memory (RAM), a magnetic disk, an optical disk, or the like.

An embodiment of this application further provides a chip, including a processor and a communication interface coupled to each other, the processor being configured to run a program or instructions to implement the processes of the embodiments of the resource selection method on a side of the higher layer of the first terminal and/or the processes of the embodiments of the resource selection method on a side of the physical layer of the first terminal, and achieve the same technical effects. To avoid repetition, details are not described herein again.

It may be understood that, the chip mentioned in this embodiment of this application may also be referred to as a system-level chip, a system chip, a chip system, a system on chip, or the like.

An embodiment of this application further provides a computer program product, where the computer program product is stored in a non-transient storage medium, and the computer program product is executed by at least one processor to implement the processes of the embodiments of the resource selection method on a side of the higher layer of the first terminal and/or the processes of the embodiments of the resource selection method on a side of the physical layer of the first terminal, and achieve the same technical effects. To avoid repetition, details are not described herein again.

It is to be noted that, the term such as "include," "comprise," or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the embodiments of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing embodiments, a person skilled in the art may clearly understand that the method according to the foregoing embodiments may be implemented by means of software and a necessary general hardware platform, or may be implemented by hardware. In some embodiments, the technical solutions of this application entirely or the part contributing to the related art may be implemented in the form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the method described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are all under the protection of this application.

What is claimed is:

1. A resource selection method, comprising:

sending, by a higher layer of a first terminal, first information to a physical layer of the first terminal, wherein:

the first information is used for assisting the physical layer of the first terminal in selecting candidate resources for sidelink transmission, and the first information comprises second information related to sidelink Discontinuous Reception (DRX) of a second terminal, wherein: the second terminal is a peer terminal for the first terminal to perform sidelink transmission, and the second information comprises at least one of the following: at least part of DRX configuration information, an active time corresponding to a drx-onDurationTimer, an active time corresponding to a drx-InactivityTimer, an active time corresponding to a drx-RetransmissionTimer, or a number of cycles of the active time;

receiving, by the higher layer of the first terminal, candidate resources reported by the physical layer of the first terminal; and selecting, by the higher layer of the first terminal, a transmission resource from the candidate resources reported by the physical layer of the first terminal.

2. The resource selection method according to claim 1, wherein the second information comprises the at least part of the DRX configuration information, and sending, by the higher layer of the first terminal, the first information to the physical layer of the first terminal comprises:

sending, by the higher layer of the first terminal, the first information to the physical layer of the first terminal when a first condition is met, wherein:

the first condition comprises at least one of the following:

that the DRX configuration information changes; or that the first terminal triggers resource selection, that the first terminal triggers resource reselection, or that the first terminal triggers any one of resource selection or resource reselection.

3. The resource selection method according to claim 1, wherein the second information comprises the active time corresponding to the drx-onDurationTimer; and sending, by the higher layer of the first terminal, the first information to the physical layer of the first terminal comprises:

sending, by the higher layer of the first terminal, the first information to the physical layer of the first terminal when a second condition is met, wherein:

the second condition comprises at least one of the following:

that the DRX configuration information changes;

that the first terminal triggers resource selection, that the first terminal triggers resource reselection, or that the first terminal triggers any one of resource selection or resource reselection;

that a current service is a broadcast service, that the current service is a groupcast service, that the current service is a unicast service, or that the current service is any one of at least two services of the broadcast service, the groupcast service, or the unicast service;

that a condition for triggering resource selection is met, that a condition for triggering resource reselection is met, or that any one of a condition for triggering resource selection or a condition for triggering resource reselection is met;

that after the higher layer of the first terminal previously sends the first information to the physical layer of the first terminal, the physical layer of the first terminal has not fed back the candidate resources or the physical layer of the first terminal has fed back the candidate resources;

that a priority of the current service is higher than a priority of a service when the higher layer of the first terminal previously sends the first information to the physical layer of the first terminal; or that a currently selected resource pool is configured as full sensing, that the currently selected resource pool is configured as partial sensing, that the currently selected resource pool is configured as random selection, or that the currently selected resource pool is configured as any one of at least two resource selection manners of the full sensing, the partial sensing, or the random selection.

4. The resource selection method according to claim 1, wherein the second information comprises the active time corresponding to the drx-InactivityTimer; and sending, by the higher layer of the first terminal, the first information to the physical layer of the first terminal comprises:

sending, by the higher layer of the first terminal, the first information to the physical layer of the first terminal when a third condition is met, wherein:

the third condition comprises at least one of the following:

that the DRX configuration information changes;

that the first terminal triggers resource selection, that the first terminal triggers resource reselection, or that the first terminal triggers any one of resource selection or resource reselection;

that the first terminal performs Sidelink Control Information (SCI) scheduling for N1 times, N1 being a positive integer;

that the first terminal starts an inactivity timer of the first terminal;

that a current service comprises at least one of a groupcast service or a unicast service;

that a condition for triggering resource selection is met, that a condition for triggering resource reselection is met, or that any one of the condition for triggering resource selection or the condition for triggering resource reselection is met;

that after the higher layer of the first terminal previously sends the first information to the physical layer of the first terminal, the physical layer of the first terminal has not fed back the candidate resources or the physical layer of the first terminal has fed back the candidate resources;

that a priority of the current service is higher than a priority of a service when the higher layer of the first terminal previously sends the first information to the physical layer of the first terminal; or that a currently selected resource pool is configured as full sensing, that the currently selected resource pool is configured as partial sensing, that the currently selected resource pool is configured as random selection, or that the currently selected resource pool is configured as any one of at least two resource selection manners of the full sensing, the partial sensing, or the random selection.

5. The resource selection method according to claim 1, wherein the second information comprises the active time corresponding to the drx-InactivityTimer; and sending, by the higher layer of the first terminal, the first information to the physical layer of the first terminal comprises:

sending, by the higher layer of the first terminal, the first information to the physical layer of the first terminal at a first moment, wherein:

the first moment comprises at least one of the following:

a moment of N2 time units before the first terminal predicts to perform Sidelink Control Information (SCI) scheduling, N2 being a positive integer;

a moment of N3 time units after the first terminal actually performs SCI scheduling, N3 being a positive integer; or a moment of N4 time units before the first terminal starts an inactivity timer of the first terminal, N4 being a positive integer.

6. The resource selection method according to claim 1, wherein the active time corresponding to the drx-InactivityTimer comprises at least one of the following:

when Sidelink Control Information (SCI) scheduling does not occur, an active time corresponding to the drx-InactivityTimer related to SCI scheduling that is predicted to occur for N5 times, N5 being a positive integer;

when SCI scheduling occurs, an active time corresponding to the drx-InactivityTimer related to current SCI scheduling;

when SCI scheduling occurs, an active time corresponding to the drx-InactivityTimer related to current SCI scheduling and an active time corresponding to the drx-InactivityTimer related to N6 times of SCI scheduling after the current SCI scheduling, N6 being a positive integer; or when a current service is a cyclic service, at least one of an active time corresponding to a drx-InactivityTimer of a current cycle or an active time corresponding to a drx-InactivityTimer of N7 cycles after the current cycle, N7 being a positive integer; and wherein:

the active time corresponding to the drx-RetransmissionTimer comprises at least one of the following:

when retransmission does not occur, an active time corresponding to the drx-RetransmissionTimer related to retransmission that is predicted to occur for N12 times, N12 being a positive integer;

when retransmission occurs, the active time corresponding to the drx-RetransmissionTimer related to current retransmission;

when retransmission occurs, an active time corresponding to the drx-RetransmissionTimer related to current retransmission and an active time corresponding to a drx-RetransmissionTimer of N13 times of retransmission after the current retransmission, N13 being a positive integer; and when a current service is a cyclic service, at least one of an active time corresponding to a drx-RetransmissionTimer of a current cycle or an active time corresponding to a drx-RetransmissionTimer of N14 cycles after the current cycle, N14 being a positive integer.

7. The resource selection method according to claim 1, wherein the second information comprises the active time corresponding to the drx-RetransmissionTimer; and sending, by the higher layer of the first terminal, the first information to the physical layer of the first terminal comprises:

sending, by the higher layer of the first terminal, the first information to the physical layer of the first terminal when a fourth condition is met, wherein:

the fourth condition comprises at least one of the following:

that the DRX configuration information changes;

that the first terminal triggers resource selection, that the first terminal triggers resource reselection, or that the first terminal triggers any one of resource selection or resource reselection;

that the first terminal receives Negative Acknowledgement (NACK) information of the second terminal for N8 times, N8 being a positive integer;

that the first terminal starts a retransmission timer of the first terminal;

that a current service is a groupcast service, that the current service is a unicast service, or that the current service is any one of the groupcast service or the unicast service;

that a condition for triggering resource selection is met, that a condition for triggering resource reselection is met, or that any one of the condition for triggering resource selection or the condition for triggering resource reselection is met;

that after the higher layer of the first terminal previously sends the first information to the physical layer of the first terminal, the physical layer of the first terminal has not fed back the candidate resources or the physical layer of the first terminal has fed back the candidate resources;

that a priority of the current service is higher than a priority of a service when the higher layer of the first terminal previously sends the first information to the physical layer of the first terminal;

that a currently selected resource pool is configured as full sensing, that the currently selected resource pool is configured as partial sensing, that the currently selected resource pool is configured as random selection, or that the currently selected resource pool is configured as any one of at least two resource selection manners of the full sensing, the partial sensing, or the random selection;

that a Physical Sidelink Feedback Channel (PSFCH) is configured for the currently selected resource pool, or the PSFCH is not configured for the currently selected resource pool; or that a Hybrid Automatic Repeat Request (HARQ) attribute of a current logical channel is enabled, or that the HARQ attribute of the current logical channel is disabled.

8. The resource selection method according to claim 1, wherein the second information comprises the active time corresponding to the drx-RetransmissionTimer; and sending, by the higher layer of the first terminal, the first information to the physical layer of the first terminal comprises:

sending, by the higher layer of the first terminal, the first information to the physical layer of the first terminal at a second moment, wherein:

the second moment comprises at least one of the following:

a moment of N9 time units before the first terminal predicts previous transmission failure, N9 being a positive integer;

a moment of N10 time units after the first terminal previously fails in transmission, N10 being a positive integer; or a moment of N11 time units before the first terminal starts a retransmission timer of the first terminal, N11 being a positive integer.

9. The resource selection method according to claim 1, wherein the first information further comprises at least one of the following:

first proportion information, wherein the first proportion information is used for indicating a proportion threshold between a first candidate resource and candidate resources to be reported by the physical layer of the first terminal, wherein the first candidate resource is a candidate resource that is in the candidate resources to be reported by the physical layer of the first terminal and that is within the active time indicated by the second information; or first indication information, wherein the first indication information is used for indicating whether the physical layer of the first terminal is allowed to report at least two sets of candidate resources, or the first indication information is used for indicating that the physical layer of the first terminal needs to report at least two sets of candidate resources.

10. The resource selection method according to claim 1, wherein selecting, by the higher layer of the first terminal, the transmission resource from the candidate resources reported by the physical layer of the first terminal comprises:

selecting, by the higher layer of the first terminal, at least one of an initial transmission resource or a retransmission resource from the candidate resources reported by the physical layer of the first terminal.

11. The resource selection method according to claim 10, wherein the candidate resources reported by the physical layer of the first terminal comprise two sets of candidate resources; and selecting, by the higher layer of the first terminal, the at least one of the initial transmission resource or the retransmission resource from the candidate resources reported by the physical layer of the first terminal comprises:

selecting, by the higher layer of the first terminal, the initial transmission resource from one set of candidate resources in the two sets of candidate resources, and selecting the retransmission resource from the other set of candidate resources.

12. The resource selection method according to claim 10, wherein the candidate resources reported by the physical layer of the first terminal comprise a first set of candidate resources and a second set of candidate resources, wherein the first set of candidate resources is used for initial transmission, and the second set of candidate resources is used for retransmission;

or the first set of candidate resources is used for initial transmission, and the second set of candidate resources is used for initial transmission and retransmission;

or the first set of candidate resources is used for initial transmission and retransmission, and the second set of candidate resources is used for retransmission.

13. The resource selection method according to claim 1, wherein before receiving, by the higher layer of the first terminal, the candidate resources reported by the physical layer of the first terminal, the method further comprises:

triggering, by the higher layer of the first terminal, resource selection at a third moment, wherein the third moment comprises one of the following:

a moment at which a data packet arrives at a logical channel of the first terminal;

a moment of N15 time units after the moment at which the data packet arrives at the logical channel of the first terminal, N15 being a positive integer; or a moment of N16 time units before a start moment of the active time indicated by the second information, N16 being a positive integer, wherein triggering resource selection at the third moment comprises:

when a current service is the cyclic service, triggering resource selection of a first cycle at a moment at which the data packet arrives at the logical channel of the first terminal in the first cycle, or triggering resource selection of the first cycle at the moment at which the data packet arrives at the logical channel of the first terminal in a cycle before the first cycle.

14. The resource selection method according to claim 1, wherein before receiving, by the higher layer of the first terminal, the candidate resources reported by the physical layer of the first terminal, the method further comprises:

triggering, by the higher layer of the first terminal, resource reselection at a fourth moment, wherein the fourth moment comprises one of the following:

a moment at which the first terminal receives Negative Acknowledgement (NACK) information of the second terminal;

a moment at which the first terminal determines that retransmission needs to be performed and there is no available retransmission resource; or a moment of N17 time units before a start moment of the active time indicated by the second information, N17 being a positive integer.

15. The resource selection method according to claim 1, wherein after the higher layer of the first terminal receives the candidate resources reported by the physical layer of the first terminal, when data transmission needs to be performed on a first logical channel or a first service, the higher layer of the first terminal does not trigger resource reselection when the candidate resources reported by the physical layer of the first terminal are available for the first logical channel or the first service, wherein a priority of the first logical channel is higher than a priority of a current logical channel of the first terminal, and a priority of the first service is higher than a priority of a current service of the first terminal.

16. The resource selection method according to claim 1, wherein selecting, by the higher layer of the first terminal, a transmission resource from the candidate resources reported by the physical layer of the first terminal comprises:

selecting, by the higher layer of the first terminal, the transmission resource from first N18 resources in the candidate resources reported by the physical layer of the first terminal, N18 being a positive integer.

17. The resource selection method according to claim 1, wherein the second information comprises the active time corresponding to the drx-onDurationTimer, the active time corresponding to the drx-InactivityTimer, and the active time corresponding to the drx-RetransmissionTimer; and sending, by the higher layer of the first terminal, the first information to the physical layer of the first terminal comprises:

sending, by the higher layer of the first terminal, the active time corresponding to the drx-onDurationTimer, the active time corresponding to the drx-InactivityTimer, and the active time corresponding to the drx-RetransmissionTimer to the physical layer of the first terminal;

or sending, by the higher layer of the first terminal, the active time corresponding to the drx-onDurationTimer and a first active time to the physical layer of the first terminal, wherein the first active time is an active time determined according to the active time corresponding to the drx-InactivityTimer and the active time corresponding to the drx-RetransmissionTimer;

or sending, by the higher layer of the first terminal, the active time corresponding to the drx-RetransmissionTimer and a second active time to the physical layer of the first terminal, wherein the second active time is an active time determined according to the active time corresponding to the drx-onDurationTimer and the active time corresponding to the drx-InactivityTimer;

or sending, by the higher layer of the first terminal, a third active time to the physical layer of the first terminal, wherein the third active time is an active time determined according to the active time corresponding to the drx-onDurationTimer, the active time corresponding to the drx-InactivityTimer, and the active time corresponding to the drx-RetransmissionTimer.

18. A resource selection method, comprising:

receiving, by a physical layer of a first terminal, first information from a higher layer of the first terminal, wherein the first information is used for assisting the physical layer of the first terminal in selecting candidate resources for sidelink transmission, and the first information comprises second information related to sidelink Discontinuous Reception (DRX) of a second terminal, wherein: the second terminal is a peer terminal for the first terminal to perform sidelink transmission, and the second information comprises at least one of the following:

at least part of DRX configuration information, an active time corresponding to a drx-onDurationTimer, an active time corresponding to a drx-InactivityTimer, an active time corresponding to a drx-RetransmissionTimer, or a number of cycles of the active time;

selecting, by the physical layer of the first terminal, candidate resources according to the first information; and reporting, by the physical layer of the first terminal, the candidate resources to the higher layer of the first terminal.

19. The resource selection method according to claim 18, wherein selecting, by the physical layer of the first terminal, the candidate resources according to the first information comprises:

selecting, by the physical layer of the first terminal, the candidate resources according to the first information when the higher layer of the first terminal triggers resource selection or resource reselection;

or selecting, by the physical layer of the first terminal, the candidate resources according to the first information when the physical layer of the first terminal receives the first information.

20. The resource selection method according to claim 18, wherein selecting, by the physical layer of the first terminal, the candidate resources according to the first information comprises:

determining, by the physical layer of the first terminal, a resource selection manner according to at least one of content of the first information or a moment at which the first information is received; and selecting, by the physical layer of the first terminal, the candidate resources according to the resource selection manner and the first information.

* * * * *